United States Patent
Knoll et al.

(10) Patent No.: US 6,529,852 B2
(45) Date of Patent: Mar. 4, 2003

(54) METHOD AND DEVICE FOR THE IMPROVEMENT OF THE POSE ACCURACY OF EFFECTORS ON MECHANISMS AND FOR THE MEASUREMENT OF OBJECTS IN A WORKSPACE

(76) Inventors: Alois Knoll, 306 Livingston Court, Edmonton (CA), T6R 2G1; Peter Kovacs, Derfflinger Str. 20, Berlin (DE), 10785

( * ) Notice: Subject to any disclaimer, the term of this patent is extended or adjusted under 35 U.S.C. 154(b) by 0 days.

(21) Appl. No.: 09/855,101

(22) Filed: May 14, 2001

(65) Prior Publication Data

US 2002/0013675 A1 Jan. 31, 2002

Related U.S. Application Data

(63) Continuation-in-part of application No. PCT/IB99/01915, filed on Nov. 12, 1999.

(30) Foreign Application Priority Data

Nov. 12, 1998 (DE) .......................................... 198 54 011

(51) Int. Cl.$^7$ .............................................. G06F 15/00
(52) U.S. Cl. ...................................... 702/150; 702/127
(58) Field of Search ................................ 702/150, 127; 700/262, 213, 166; 600/425; 414/795; 356/138, 614; 128/922; 901/16, 2, 47; 703/1, 6, 315, 4, 800; 74/490; 345/854; 707/1; 709/315

(56) References Cited

U.S. PATENT DOCUMENTS

| | | | |
|---|---|---|---|
| 4,662,752 A | * | 5/1987 | Tucker et al. ................ 356/614 |
| 4,763,276 A | * | 8/1988 | Perreirra et al. ............. 700/254 |
| 4,831,549 A | * | 5/1989 | Red et al. ..................... 700/254 |
| 5,177,563 A | * | 1/1993 | Everett et al. ................ 356/621 |
| 5,297,238 A | * | 3/1994 | Wang et al. ................. 700/254 |
| 5,951,475 A | * | 9/1999 | Gueziec et al. ............. 128/922 |
| 6,044,308 A | * | 3/2000 | Huissoon ..................... 700/166 |
| 6,345,213 B1 | * | 2/2002 | Graeser et al. ......... 219/124.34 |

* cited by examiner

*Primary Examiner*—John S. Hilten
*Assistant Examiner*—Xiuqin Sun
(74) *Attorney, Agent, or Firm*—Cohen, Pontani, Lieberman & Pavane

(57) ABSTRACT

A device and a method for measuring the pose of mechanisms includes at least one effector object fixedly joined to a mechanism (e.g., industrial robot, hexapod) in which the at least one effector object moves along one of several axes. The ideal, effective shape of the at least one effector object is a point, a straight line, a plane, an ellipsoid, a cylinder, a hyperboloid or a combination thereof. The movable effector objects interact with reference objects which are arranged in defined positions relative to the mechanism. The interactions are detected by a suitable sensor. The interactions are detected, only the pertaining joint configuration of the mechanism is transmitted to the information processing unit and evaluated and no further continuous values of measuring parameters are required for the evaluation.

31 Claims, 10 Drawing Sheets

METHOD AND DEVICE FOR THE IMPROVEMENT OF THE POSE ACCURACY OF EFFECTORS ON MECHANISMS AND FOR THE MEASUREMENT OF OBJECTS IN A WORKSPACE

RELATED APPLICATIONS

This application is a Continuation-in-Part under 35 U.S.C. §111 and 37 CFR §1.53 of International PCT Application No. PCT/IB99/01915 which was filed on Nov. 12, 1999, published as publication No. WO 00/29175 on May 25, 2000, and claims priority from German application No. 198 54 011.6 filed Nov. 12, 1998.

BACKGROUND OF THE INVENTION

1. Field of the Invention

The invention concerns a method and device for improving the pose accuracy of a mechanism having tolerances in a workspace, the mechanism being movable in at least one axis and having an effector, wherein at least one effector object is fixedly mounted on the effector and is eccentric relative to the at least one axis of the mechanism and at least one reference object is arranged in the workspace so that it is fixed relative to the mechanism. A computer system with measurement and control programs is operatively connected to the mechanism. The effector and reference object form a signal trigger/signal detector pair suitable for enabling the triggering and detection of at least binary signals, wherein the totality of the signal poses of the detector relative to the trigger device in which a signal is triggered on the detector may be described by at least one non-trivial characteristic equation.

2. Description of the Related Art

A number of methods for improving pose accuracy of a mechanism are known in the art. For example, FR-A-2 696 969 discloses a calibration method in which a laser beam is fastened at the last segment of a robot and a measurement plane close to the robot is used as reference. The robot approaches a series of hand poses (which are not more closely specified) in which the laser beam meets the measurement plane. After this, the coordinates of the contact points on the measurement plane are identified photographically. From these and from the associated joint configurations from the estimated values for the pose of the measurement plane and from the pose of the laser relative to the hand, the robot parameters are calculated by means of a variation of the Newton calculus of observations method (Levenberg-Marquart method).

In the primary embodiment of this reference, the measurement plane is a mirror or opaque projection screen and the laser beam which meets it is photographed by a camera positioned in front of the mirror. The use of markers on the projection screen is not explained any more closely and is apparently intended to serve the creation of a relation between the camera and projection screen. The measurement plane may also be designed as an optical matrix sensor.

In accordance with further embodiments, two measurement sequences are photographed. Between the two measurement sequences either the laser is mounted at another point, the position of which with respect to a tool support, e.g. point of the hand, is known or the position of the mirror is altered—the orientation is not mentioned in this reference.

The altered poses are not specified any more closely. The following explanation is given: if the measurement sequence is selected unintelligently, several values may come into question mathematically for identification of the parameters. To prevent such a problem, two different mirror poses are suggested. Problematical is the fact that, using a laser beam, it is not possible to identify the position of the laser or the tool relative to the root of the hand completely. In addition, two intersecting laser beams are used to identify the $5^{th}$ and $6^{th}$ parameters of the tool position. Moreover, the system is inexact due to the distortion of the image of the measurement plane by the camera.

Further attempts to identify robot parameters are apparently contained in an essay by Newman, Osborn, "A new method for kinematic parameter calibration via laser line tracking", Proc. Int. Conf. Robotics and Automation, USA, Atlanta (1993), p. 160–165. In this reference, a laser beam is fixedly set up in space close to a robot. A special detector is fastened to the hand of the robot that consists of a planar, rectangular light sensor divided into four separate quadrants. The quadrants meet at a center-point. Each of the four quadrant sensors provides a brightness value. The robot moves the hand successively in various measurement poses defined by the fact that the brightness values provided by the four sensors are identical. The robot parameters are calculated using Newton's calculus of observations from the joint configuration of the measurement poses and the estimated values for the pose of the laser and the detector relative to the hand. The authors describe a principal structure of the experiment and then report on results of a two-dimensional simulation of their principle on the basis of a two-dimensional robot with two-joints. Not all kinematic parameters may be determined by this method. In particular, the pose of the robot relative to a prescribed coordinate system cannot be identified but only dimensionless parameters, thus making it impossible to derive an absolute size standard of the robot. It is not explained what has to happen in three-dimensional space if the sensor plane does not stand perpendicularly on the laser beam.

The re-calibration of small parameter modifications is described by an essay "Autonomous robot calibration using a trigger probe" by Zhong et al. in the US magazine Robotics+Autonomous Systems, 18 (1996) S. 395–410. Three plates are fastened in the vicinity of the robot which stand exactly perpendicularly with respect to each other. The robot takes up an omni-directional mechanical probe and approaches a series of hand poses which are not specified more closely and in which the probe touches the plate or triggers the internal contact of the probe. The associated joint configurations are evaluated by a neural network which supplies the robot parameters as result. True sizes cannot by determined by this method as only relative modifications are recognized. Some information is lacking, for example, the true distance between robot and plates, the authors ascertain.

The disclosures of WO96/30171 and WO 93/11915 describe methods and devices for the calibration of the axes of motion of industrial robots.

In WO 96/30171, a calibration device is used which consists of a calibration beam, e.g. a laser in the workspace of a robot, and an associated interrupter detector. A sphere with known radius is mounted on the hand of the robot. The robot heads for a series of hand poses, not specified more closely, in which the calibration beam of the sphere is interrupted. The calibration parameters are calculated by means of the Newtonian-Gauss method from the associated joint configurations, the estimated values for the robot pose, and the pose of the laser relative to the hand. In the preferred embodiment, the calibration beam has to stand perpendicularly on the x-y plane defined by the robot basis. With certain exceptions, six calibration parameters are calculated for each axis.

The accuracy of the calibration parameters may be increased by calculating them several times. In doing so the calibration beam is put into various positions in the workspace. The calibration parameters are then calculated as the mean value of the calibration parameters for the various beam poses. To obtain the greatest variations between the robot configurations used, the robot may be equipped with several calibration beams the pose of which is selected in such a manner that the greatest possible differences between the robot configurations during the various measurements are achieved.

According to the WO 93/11915, a calibration body is used which consists of a cuboid with exactly parallel lateral sides in the workspace of the robot. A sphere with known radius is mounted on the hand of the robot. The robot heads for a series of pairs of hand poses, not specified more closely, in which the sphere touches the cuboid once on any arbitrary side of the cuboid and then again on the opposite side. The presentation and the manner of the subsequent calculation indicate that the second contact point has to lie exactly on the perpendicular of the cuboid point opposite to the first point.

The calculation of the robot parameter takes place in iteration steps. In each step, the relevant coordinate differences of the associated pairs of hand poses are determined first of all on the basis of the current approximation values for all parameters sought by the inventor. If the sum of the squares of these differences deviates from a desired value resulting from the known cuboid dimensions, a Gauss-Newtonian step is carried out.

In one embodiment, the calibration body has to be aligned to the coordinate axes of the robot base. In a further embodiment, the orientation of the calibration body can be arbitrary. Apparently, three additional equations are necessary to identify the three additional orientation parameters.

Neither systems supply exact values as obviously the mathematical and kinematic concepts have not been recognised.

SUMMARY OF THE INVENTION

It is an object of the present invention to provide improved methods and devices for the identification of all parameters influencing the pose or the pose accuracy of a mechanism in its true size for as exact as possible direct control of target poses. It is a further object of the present invention to provide an improved method and device for determining pose accuracy that has a favourable cost/utility ratio and does not use traditional measuring instruments, obstructive auxiliary objects in the workspace or manual teach-in methods.

Furthermore, the method and device according to the present invention will determine the exact pose of a reference point on the mechanism with respect to its environment and with respect to an object in the workspace or between objects in their true size.

The object of the present invention is met by a method for improving the pose accuracy of a mechanism in a workspace, wherein the mechanism is movable in at least one axis with tolerances and includes an effector, at least one effector object is mounted via a rigid connection to the effector eccentric to the at least one axis of the mechanism in an estimated pose with a tolerance in position and orientation, at least one reference object is arranged in the workspace with a tolerance in position and orientation, and a computer system is connected to the mechanism having a measurement control program, a parameter identification program, and a mechanism control program, the at least one effector object and the at least one reference object forming at least one trigger/detector pair comprising a signal trigger device and a signal detector for triggering and detecting a binary signal, wherein a totality of signal poses of the signal detector relative to the trigger device in which a signal is triggered on the signal detector is described by at least one non-trivial characteristic equation, said method comprising the following steps:

(a) selecting a proximity sequence N of a finite number of proximity poses for the at least one trigger-detector pair, each of the proximity poses being located in the vicinity of a respective one of signal poses, wherein the proximity sequence N is selected such that the following criteria are fulfilled:

$D_G(N) \geq D_G(A_I)/15$, whereby the distance on an arbitrary straight line G between two neighbouring points of the projection of the proximity sequence N onto G is at the most $D_G(N)/4$, wherein $D_G$ is a function which maps each subset of the set $A_I$ to the distance between those two points of the projection of this subset on G which are at maximum distance from each other on G;

$A_I$ is the space of all those reachable effector poses of the given mechanism which result from elementary kinematic calculations on the basis of the known mechanism model which in turn is afflicted with tolerances;

G is an arbitrary straight line which contains at least two points of $S_I$; and $S_I$ is a subset of $A_I$ which is denotes the space of proximity poses and is defined by the totality of all those effector object poses where a signal would be expected according to a mathematical calculation based on the parameter values of the known tolerance-afflicted mechanism model, the estimated pose of the reference objects in space, and the estimated pose of the effector object on the mechanism.

(b) searching for a nearby signal pose for each of the proximity poses consecutively through movement of one of the at least one effector object and the mechanism using a simple search algorithm until a signal pose is detected;

(c) passing a momentary joint configuration of the mechanism onto the computer system after the detection thereof in said step (b) and storing the momentary joint configuration in the computer system as a data record;

(d) using a parameter identification program to identify the true values of one of the parameters influencing the pose accuracy of the mechanism and user-specific subsets of this parameter set, whereby a scaling factor is used for the identification of all length-parameters.

The scaling factor may be identified by moving an effector object into two pose sets A and B of cardinality, whereby information about the distance between the poses of A and those of B is known. Alternatively, the scaling factor may be identified using at least three calibration objects comprising at least one effector object and at least two reference objects, wherein the at least one effector object is moved into signal poses with respect to the two reference objects with a known relative pose to each other. Furthermore, the three calibration objects may alternatively comprise at least two effector objects and at least one reference object, wherein the at least two effector objects with known relative pose to each other are moved into signal poses with respect to the at least one reference object.

The distance between the poses of the sets A and B or between the locations, calibration objects, or effector objects respectively amounts—for the purpose of error damping—to more than ⅙ of the diameter of the workspace Δ, preferably ¾Δ and the diameter of the workspace is defined by the maximum of $D_G(A_I)$ where G ranges over all straight lines G and a mean value calculation is carried out for the determination distances.

The method according to the present invention may be used for complete or partial re-calibration of the mechanisms or of subsections of the mechanisms.

The following pairs of reference/effector objects, which are in general denoted calibration objects, are examples which may be used and which may optionally be interchanged:

i) signal detector and straight electromagnetic wave/cylindrical interrupter rod;

ii) signal detector and electrically conductive wire/contact rod;

iii) laser beam/light-sensitive matrix area;

iv) electrically conductive plane, conductive contact rod;

v) guidance with contact threshold on rotary axis/guided rod on rotary axis;

vi) point-shaped or planar signal detectors/plane of electromagnetic waves; and vii) wedge-formed electromagnetic wave, several signal detectors.

The object of the present invention is met by a device for improving the pose accuracy of a mechanism and for pose measurement of objects in the work space, including a computer system comprising measurement control program, a parameter identification program, and a mechanism control program and a mechanism moveable in at least one axis which has an effector, the mechanism being connected to the computer system. At least one pair of devices comprising calibration objects includes an effector object rigidly connected with the effector and mounted eccentrically to the at least one axis of the mechanism and a reference object fixedly arranged relative to the mechanism in the workspace, each pair comprising a signal trigger device and a signal detector for binary signals. The device also includes an installation for determining a scaling factor.

This device is used in the application of the method for pose measurement of mechanisms and objects in the workspace, absolutely or relatively to each other.

The object of the present invention is also met by a method and a device for improving the pose accuracy of mechanisms in a workspace including a mechanism moveable in a least one axis and afflicted with tolerances which has an effector at its disposal, at least one effector object is mounted via a rigid connection to the effector ecentric to the at least one axis of the mechanism in an estimated pose with tolerance in position and orientation, at least one immaterial reference object in the workspace which is arranged fixedly relative to the mechanism in an estimated pose having a tolerance in position and orientation, and a computer system with a measurement control program and a mechanism control program, wherein the at least one effector object and the at least one reference object form a trigger/detector pair suitable for enabling the triggering and detection of at least binary signals, the totality of the signal poses of the detector relative to the trigger device in which a signal is triggered on the detector is described by at least one non-trivial characteristic equation, the method including the following process steps:

(a) selecting a proximity sequence N such that it contains at least one proximity pose of the at least one effector object arranged at a reference object neighbouring a target pose;

(b) successively searching for one nearby signal pose through the motion of one of the effector object and mechanism via a simple search algorithm for the at least one proximity pose via detection;

(c) passing a momentary joint configuration of the mechanism onto the computer system and storing the momentary joint configuration as a data record;

(d) using the computer system to calculate, for each data record, the incorrect pose of the mechanism in the workspace resulting mathematically on the basis of the mechanism parameters currently known to the controller; and (e) calculating a correction movement from the difference between the signal poses and the associated incorrect poses through elementary interpolation procedures and elementary error compensation algorithms, the correction movement compensating the deviation of the pose actually steered for by the mechanism control from the target pose, whereby a scalar factor, which was determined from the exactly known pose of the reference object, is used for the calculation of the correction movement between the incorrect poses and the signal poses.

Summarising, the present invention identifies efficiently and precisely the parameters influencing the pose accuracy of a generic mechanism at a very favourable cost/utility ratio.

Pertaining to the present invention, sensors (joint encoders) existent in the mechanism are used as well as simplest additional measuring devices which in accordance with the basic function principle may comprise the simplest binary sensors or detectors.

Apart from this, the task of identifying only a certain subset of parameters in a re-calibration efficiently (e.g. such for which it is known that they are altered during operation of the mechanism more quickly than others due to wear and tear) is solved. This means that appreciable expenditure can be saved over the prior art.

In industrial practice, the identification of the pose of a mechanism with respect to the spatial position of a work cell is particularly important.

The method of the present invention may further be supported by a learning system which for its part recognises the residue errors of the calibration process and, through training at the actual mechanism, compensates these errors in its control of the mechanism. The learning system may be integrated fully into the overall process thereby increasing significantly the efficiency of the learning system over previous isolated solution approaches.

A method similar to calibration, denoted here as interpolation, is used for alternative or additional local improvement of the pose accuracy whereby no additional devices are necessary.

Besides the calibration of a mechanism, a specific variation of the method pertaining to the present invention solves the task of identifying precisely the pose of the effector of a (not necessarily calibrated) mechanism relative to the reference objects or a reference coordinate system, workpieces relative to the effector of (not necessarily calibrated) mechanisms, or between arbitrary objects and/or mechanisms with limited, one-time preparation expense and extremely low apparatus expense.

Through specialisation of the method according to the present invention, devices and methods may be gained which are suitable specially for calibration (restriction to approx. 2 to 4 reference objects) or specially for pose measurement (design of special, one-axis measurement mechanisms and special reference objects with the aid of which (indirectly) the pose of arbitrary objects to another may be identified).

The superiority of this shape-adjusting method over previous calibration methods is shown in practical application at least by the following advantages:

- simple conceivable installation of the measurement devices;
- no calibration of the measurement devices necessary;
- lowest costs and service-friendliness through extremely simple measurement setup;
- measurement without contact possible so that there is no wear and tear on the measurement set-up;
- execution of calibrations at minimum preparation expense and, due to this, frequent (e.g. daily) repetition possible;
- guarantee of absolute accuracy of mechanisms over their complete life-term;
- the measurement set-up can be integrated completely in the mechanism thus eliminating additional installations in the workspace of the mechanism; and
- calibration of subsections of mechanisms possible, through this appreciable
- savings in time.

Through this, there are appreciable cost and personnel savings for the user of mechanisms which require calibration while a high degree of accuracy of these mechanisms and resulting high manipulation quality is guaranteed. This results, for example, in a high production quality when used on industrial robots.

The method pertaining to the invention is now to be explained in detail. In doing so, the individual devices and installation or method steps and terms will be explained in connection with their function as this is more comprehensible than a summarising abstract explanation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 7a is a schematic diagram of an interrupter rod according to an embodiment of the present invention;

FIGS. 7b and 7c show possible motion trajectories of the interrupter rod of FIG. 7a;

DETAILED DESCRIPTION OF THE PRESENTLY PREFERRED EMBODIMENTS

Figure 1:
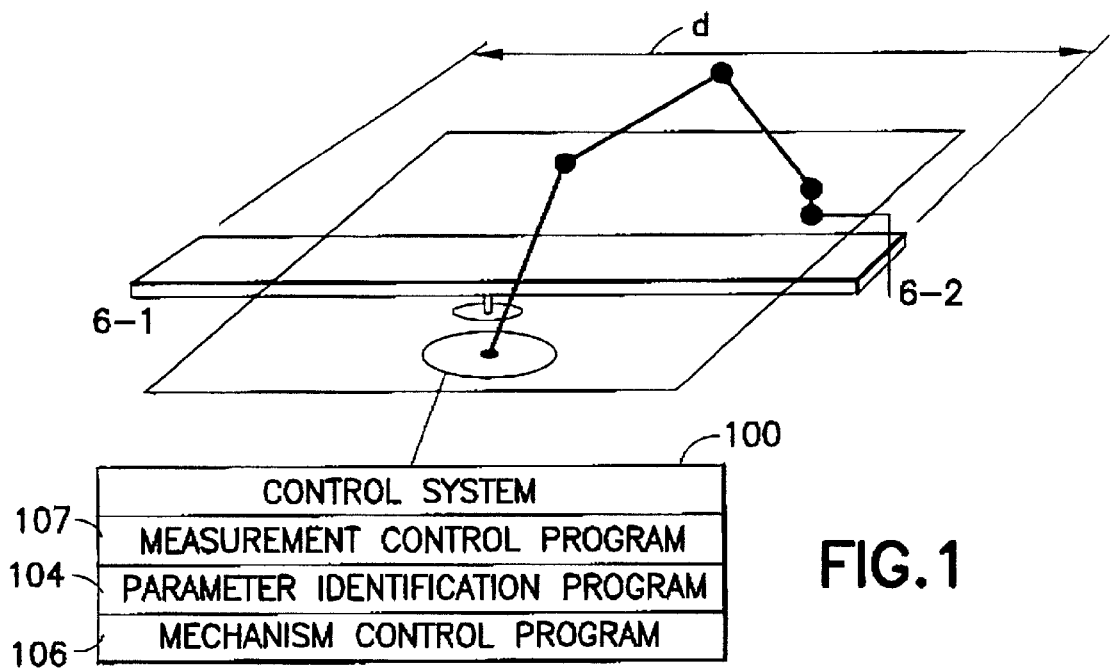
FIG. 1 is a schematic diagram showing the identification of scaling factors using a length standard of a known length and a mechanism according to an embodiment of the present invention.

Before describing the present invention relative to the drawings, the concepts and inventive features used to describe the invention in the specification are explained as follows.

Pose, workspace and dimensions of the workspace:

A pose of an arbitrary object or coordinate system specifies the position and the orientation of the arbitrary object or coordinate system with respect to a reference coordinate system. A workspace is the space of the poses that an effector hand or grippers—denoted also as end effector—of a specific mechanism can occupy. In a typical industrial robot, the position of the effector may be varied in all three dimensions of the visual space. In addition, the orientation of the effector may customarily be altered through rotation about two or three axes. The dimension of the workspace are defined graphically (exactly: according to linear algebra or algebraic geometry), for typical industrial robots the dimensions may be defined by six, sometimes five, parameters.

Joint Configuration of the Mechanism:

A joint configuration is a complete set of joint values of a mechanism. For a revolute joint the joint value specifies an angle of revolution and for a prismatic or sliding joint the joint value specifies a displacement. The joint configuration of a typical industrial robot with six revolute joints therefore includes a specification of six angles of revolution. Each joint configuration determines the pose of a gripper, i.e., end effector, of the robot.

The following new definitions of terms support the formulation of the object of the present invention:

Signal Pose, Signal Configuration, Signal Space:

A signal pose is a pose of an effector object relative to the reference object in which a signal is triggered at a detector. A signal configuration is a special joint configuration which places the effector object in a signal pose. The signal space is the space (more precisely: the algebraic variety) of all poses of an effector object which trigger a signal, i.e., all signal poses of the effector object, whereby the effector should be mounted rigidly on a specific, given mechanism. Hereby, all exterior obstacles, reciprocal physical penetration of the objects concerned, or the gradual restrictions of the detectors or devices triggering signals (e.g., from the fact that a photo detector only possesses a restricted aperture) may be derived. Depending on the context, the location of the mechanism may be derived or the restrictions of the detectors or triggers are included. In the latter case, the signal space is dependent on the dimensions of the calibration object, i.e., the detector or trigger.

Measurement Poses, Measurement Configurations, Measurement Sequence, Measurement:

Measurement configurations are those signal configurations which are actually occupied by the mechanism in the course of a closed calibration or interpolation, i.e., determination of a scaling factor. Measurement poses trigger a signal on a detector. Measurement poses are the poses of the measurement configurations used during a calibration or interpolation. A measurement sequence is the totality of all measurement poses which in the course of a closed calibration or interpolation are actually occupied by the mechanism. The term measurement is often used here in the special sense of a closed cycle comprising two process steps of the first solution, namely, movement of the effector object into an proximity pose, search for the signal pose, triggering of the signal and storage of the associated joint configuration in the computer system in response to the triggering of a signal.

Mechanisms, Pose Accuracy:

The mechanism pertaining to the invention includes rigid links which are connected to each other by joints. The joints are normally actuated or passive revolute joints, prismatic joints, or a combination of these. The method according to the present invention is used primarily for typical industrial robots with six joints or so-called tripods and hexapods. The mechanism is equipped with an effector which can be a common robot gripper or any desired tool and the range of which determines the workspace of the mechanism.

The geometry of a mechanism may be described by the so-called kinematic parameters, i.e., for example, by the constant lengths of the arm links. These parameters are presented as Denavit-Hartenberg or Hayati parameters e.g. in the book by Schröer, "Identifikation von Kalibrationsparametem kinematischer Ketten" (Identification of Calibration Parameters of Kinematic Chains) Hanser Publishing House, Munich, Germany, 1993, the revelation of which is included by the inventors in this description by way of quotation. In addition to the kinematic parameters, the pose of the effectors is also influenced by non-kinematic parameters such as, for example, joint elasticity, beam elasticity and the backlash (Schröer). Summarizing, both kinematic and non-kinematic parameters are described as mechanism parameters. If the mechanism parameters are known, the associated joint configuration for a desired target pose of the mechanism (joint angle and joint displacement) may be calculated to move the effector into a desired pose. The actual values of these parameters may not known exactly due to production tolerances. Therefore, a control for the mechanism customarily uses ideal (desired) parameters on the basis of information supplied by the manufacturer. The effector poses calculated on the basis of the ideal parameter values deviate from the actual desired poses. If the deviation for a first mechanism is on average smaller than the deviation for a second mechanism, it is said that the pose accuracy of the first mechanism is greater than that of the second mechanism. The identification of the actual parameters of a mechanism is designated as calibration for the purpose of increasing the pose accuracy.

The term "position accuracy" is used frequently in the state of the art. However, in the present specification the term pose accuracy is preferred because pose is defined by position and orientation.

Calibration Objects:

According to the process of the present invention, the mechanism functions together with several calibration objects. The calibration objects include at least one effector object and at least one reference object, whereby one effector object and reference object pair each form a trigger/detector pair including a signal detector and a signal trigger device. In the embodiments/devices according to the present invention, the term object is used for the implementation into hardware. For example, amongst other things, the following trigger/detector pairs are suggested and the relationship process term/device component stated:

i) Laser Light plane generated by Cylinder Lens/photo Detector or Line Scanning Camera
   e.g. laser diode module LDA1015 from ILEE, US with cylinder lens ILEE 1:4 or 1:1,
   line scanning camera 703/M from Vistek, Germany
   other possibility for embodiment: periodical movement of the laser beam or revolving polygon mirror ii) Laser Beam/photo Detector or Matrix Camera
e.g. laser diode module ILE-LDA1015 from ILEE, USA,
matrix camera ultra-miniature camera module (b/w), no.: 11 51 93 from Conrad, Germany
position-sensitive Si detector PSD 2L30 from Sitek, SE
iii) Light Barrier/cylindrical Interrupter Rod
e.g. light barrier YD50 from. Wenglor, DE
iv) electr. loaded wire/conductive, cylindrical contact rod
v) electr. loaded level plate or liquid surface/conductive contact tip or contact cone
vi) prismatic joint half-equipped with electr. or. opt. contact/other prismatic joint halves which are equipped with a contact maker whereby the contact is triggered at certain displacement of the joint.

Which of the calibration objects is a trigger and which is a detector is in general freely definable. However, in some cases, one of the two variations is not realisable, e.g. a trough filled with liquid can hardly be an effector object. Each effector object is mounted by a boom on the effector. The boom provides for an eccentricity with respect to the joint axes of the mechanism as the parameter identification of individual mechanism parameters may otherwise fail.

The exact mounting pose of the effector object relative to the effector with respect to the coordinate system does not have to be known exactly but needs to be estimated.

The reference objects are fixedly arranged or mounted such that they can be reached by the effector object. The pose of a reference object relative to the basis of the mechanism also does not have to be known precisely.

All parameters which are identified during calibration are designated as calibration parameters. Besides the mechanism parameters, other parameters which are not of interest after conclusion of calibration or do not influence the pose accuracy are also determined. The other parameters are in general only the pose parameters of the reference objects. The pose parameters must necessarily be identified together with the mechanism parameters. If certain parameters are assumed during a calibration as being known and not identified, they are not counted amongst the calibration parameters for each case.

In accordance with the basic principle of function, the detectors may always consist of the simplest binary sensors. For the purpose of alleviation of the explained search for signal poses or search algorithms, light-sensitive lines or areas, i.e. arrays of binary sensors such as line-scanning cameras or matrix cameras or CCD cameras may, however, be used as detectors.

Computer System with Programs:

For calibration according to the invention, a computer system is necessary which includes a program for the control of the mechanism, a measurement flow program for controlling the collection of measuring data by the robot, and a parameter identification program for calculating the calibration parameters from the measuring data by mathematical algorithms of the calculus of observations.

After calibration, the identified, exact mechanism parameters are used for more precise control of the mechanism. To this end, they are transferred to the mechanism control program which, from this, calculates improved joint configurations for the desired target poses of the effector so that future attempts to achieve the target poses are more exact than before the calibration.

Characteristic Equations:

The trigger and detector pairs of the present invention are characterised by the fact that a signal is not triggered in any desired pose but only in specific poses. For the purpose of carrying out the parameter identification or the calculus of observations, the connection between the calibration parameters and signal configurations are described by characteristic equations which are derived from the shape of the calibration objects. If abstraction first takes place from the restrictions of the effector object pose conditioned by the mechanism, the basic form of the characteristic equation(s) may be derived directly from the shape of the calibration objects. These result for the above-mentioned embodiments from the following simple geometric signal conditions:

i) intersection of a plane in space with a point;
ii) intersection of a straight line in space with a point (two equations);
iii) intersection of two straight lines in space;
iv) intersection of a plane in space with a point (the contact of a plane with a sphere can be modelled as the intersection of a plane in space with the centre point of the sphere shifted by the radius of the sphere once it has been established on which side of the plane the sphere is located); and
v) constant distance of two points in space.

One side of each characteristic equation describes the pose of the trigger and the other side describes the pose of the detector relative to the trigger. In a further step, the restrictions of the concrete mechanism are included in the considerations. For this, the parameters which describe the pose of the effector object in the basic equations are expressed by joint variables of the corresponding joint configuration and by the not exactly known constant mechanism parameters which model the geometric structure of the mechanism and by non-kinematic phenomena such as joint elasticies. The pose description of the effector object relative to the basis of the effectors is also counted amongst the mechanism parameters. The final characteristic equations are obtained as a result of replacement of the parameters describing trigger and detector pose by the latter expressions. The reference object is mounted fixedly in the workspace, its pose (parameters) does not need to be expressed by other quantities. A complete set of characteristic equations contains all calibration parameters to be identified.

Suitable types of trigger-detector pairs for the process pertaining to the present invention are those for which (simple) characteristic equations exist. A light bulb and a photo detector are, for example, not suitable as the photo detector always receives light as soon as it is not turned away completely from the light source.

The shape-adjusting calibration methods which are the object of the present invention differ with respect to the characteristic equations fundamentally from the traditional calibration methods which work by traditional, expensive measurement devices. In the traditional calibration methods, each pose of the effector is a potential measurement pose. For example, each effector pose can be measured by a theodolite system. Strictly mathematically speaking, one could say that the characteristic equations associated to these methods are therefore trivial (e.g. 0=0).

Various embodiments of shape-adjusting calibration methods are closely related when the totality of their characteristic equations is equivalent.

Proximity series:

The task of the present invention is solved in that the effector objects which are fixed on the mechanism to be calibrated are moved into various signal poses.

The signal poses are not exactly known. On the basis of the mechanism parameter values which are provided by the manufacturer and which are afflicted with tolerances or of the estimates influenced by tolerances or of measurements of all calibration parameters, one can, nevertheless, calculate effector poses by the characteristic equations which lie close to signal poses. These poses calculated by the characteristic equations are designated as proximity poses.

For the calibration to be successful, the measurement sequence—i.e. the signal poses—must satisfy certain criteria. According to the present invention it is sufficient to formulate the qualitatively new criteria just for the calculable proximity poses. The signal poses found assuming this will satisfy the certain criteria due to their proximity to the proximity poses. If no signal pose can be found for a particular proximity pose, that proximity pose is simply discarded in a later step.

The first criterion forces sufficient expansion of the proximity poses in the workspace. The second criterion—which is less important than the first criterion—forces sufficient distribution or prevents unfavourable accumulation. For the purpose of explaining these criteria, poses are understood from now on (as is customary in robotics) also as points of the six-dimensional workspace. Both criteria are based on the selection of an arbitrary desired straight line G in the workspace which has to contain as the only requirement two poses from $S_f$; this will be explained later. The first criterion $D_G(N) > D_G(A_f)/15$ states, formulated roughly, that the expansion of the proximity series (and the closely located signal poses) along or in the direction of the straight line G must amount to approximately 1/15 of the expansion of the workspace in the same direction. This statement has to apply for all straight lines, in particular also for the axes of the reference coordinate system as long as they contain more than one pose from $S_f$. If the expansion of the workspace along the z-axis (or the projection to the z-axis) measures e.g. 1500 mm, at least two proximity poses should exist in N, the z coordinate of which must show a difference of 100 mm.

According to the second criterion, the distance on a straight line G between two neighbouring points of the projection of the proximity series N onto G should be a maximum of DG(N)/4. This second criterion is designated in the following as the distribution criterion. In the above example, the distribution criterion requires that for a desired proximity pose there must be a further one in N the z coordinate of which differs at the most 100/4=25 mm from the z-coordinate of the first.

The straight line G must contain two poses from $S_f$ as otherwise it could stand perpendicularly on $S_f$. In the latter case, however, $D_G(N)=0$ has to apply. This applies quite analogously to the statement that the projection of a plane onto a straight line, which stands perpendicularly on it, results in a single projection point and thus, the distance between the projection points furthest away from one another must be 0.

The method pertaining to the invention demands only the fulfilment of the two criteria but makes no statement as to how the proximity series is selected. The selection may take place either by means of any desired system of selection or also by means of random selection of the proximity poses.

In concrete applications, it is not necessary to check the fulfilment of the two criteria minutely, i.e. to carry out mathematically genuine measurement and then carry out the necessary calculations to determine a natural metric and scalar product in the workspace and determine the projections of the proximity series. The main statement is rather that these are the decisive criteria which have to be optimised to obtain high-quality results in practice. The accuracy of the parameters and poses may be increased asymptotically against a practically achievable maximum if N and, if relevant, the calibration object dimensions are selected in such a manner that, instead of the worst limit values stated, the best possible limit values of the criteria are approximated i.e.

$D_G(N) > D_G(A_f)$ and (subordinate)

$D_G(\{n_i, n_j\}) > 0$ for neighbouring proximity poses $n_i$, $n_j$.

The maximising of the criteria here is to be regarded as a practical design guidelines. With the fundamental term of a convex hull of N from mathematical topology, the criteria and the design guidelines can be formulated more clearly but not quantified. The term of the convex hull of a set of points may be understood visually in short as a rigidly taut cloth which is hulled around the set of points. Put briefly, for the purpose of achieving the best limit values of the criteria, additional proximity poses are to be selected outside or inside the convex hull of N depending on where currently there are "gaps", i.e. where projections of N onto straight lines G do not yet overfulfil the criteria to the extent as is the case of other straight lines. The two criteria can be formulated as follows: the dimension of the convex hull of N has to be equal to the dimension of the signal space and its associated volume—with respect to each signal space dimension—should be as large as possible, and the proximity or measurement sequence should be distributed relatively equally in the convex hull.

Violation of the dimension criterion for the proximity poses results generally, even under otherwise ideal conditions—i.e. excluding all measurement errors and practical inaccuracies in a mathematical simulation—in a complete collapse of shape-adjusting methods. Consideration of these criteria is one of the central doctrines of the method according to the present invention.

The worst case limits of the criteria the quantification of which is, as already mentioned, practically unimportant—have been identified for the case of a single proximity series on a single boom detector pair and stated for the identification of all relevant calibration parameters. If fewer parameters are identified, the criteria are weakened proportionally to that number. In the case of several proximity series $N_1$, $N_2$, $N_3$, ..., the proximity series N in the criterion $D_G(N) > D_G(A_f)/15$ must be replaced by the unification of all $N_i$. The distribution criterion must be fulfilled for each $N_i$.

Optimisations in accordance with the criteria have an asymptotic effect, i.e. simple strategies which are orientated to these criteria will achieve good practical results but lavish and complicated improvements in the strategies will scarcely increase the accuracy measurably.

Without knowledge of the criteria pertaining to the present invention, their fulfilment will generally fail even under well reflected selection of the proximity series as the signal space is five-dimensional for most of the closely related method embodiments and consequently may no longer be comprehended easily. For this reason, selection of the measurement sequence according to other criteria or algorithms often violates the dimension criteria. Close to the stated lower limits, the accuracy of the parameters or pose accuracy deteriorates drastically or the parameter identification collapses.

With knowledge of the criteria, the selection of a suitable proximity series is always straightforward as the above-mentioned design guidelines shows. There is, however a major exception: for some embodiments of the method according to the present invention, the calibration object dimensions exert influence on the signal space size. If these dimensions are selected insufficiently without knowledge of the criteria c) and d), the method must fail if $D_G(S_I) < D_G(A_I)/15$
because trivially by definition $D_G(N) \leq D_G(S_I)$ In this case, the method in no way guarantees success.

An embodiment in which the effector object is an interrupter and the reference object is laser light barrier may be used to illustrate this exception. Assume that a common industrial robot with a workspace diameter of approximately 160 cm (e.g., Puma 560 from Stäubli, CH with an extended arm length of 80 cm and almost spherical workspace) is to be calibrated and an interrupter rod is used which is 10 cm in length. Assume that the robot or the effector stands in a signal pose and assume that a straight line G is laid into the workspace which at constant orientation is identical with the interrupter rod. Accordingly, all effector poses on G within an interval of 10 cm are signal poses. Consequently, the following holds $D_G(N)-D_G(S_I)-10$ cm.

Assuming that $D_G(A_I)=160$ cm, then $$D_G(N)-D_G(S_I) < D_G(A_I)*10/160 \text{ applies,}$$

thus criterion $D_G(N) > D_G(A_I)/15$ is violated.

Further examples are the embodiments recognisable from the state of the art for which the reference object is a light barrier and the effector object a sphere. Due to the dimensions in associated diagrams, they violate the criterion $D_G(N) > D_G(A_I)/15$ also and are thus unsuitable for practical use.

The lack of knowledge or unaware non-observance of the criteria of the present invention both in the dimensioning of the calibration objects and the selection of the measurement sequence have been a significant reason for the limited practical successes of similar approaches in the past.

It is always easy for the specialist to identify those calibration object dimensions which exert influence on the size of the signal space and to determine how these have to be altered to enlarge the signal space and fulfil the criteria. In the above-mentioned example, an interrupter rod having a length, for example, of 20 to 25 cm could be selected or, in the methods mentioned, the radius of the depicted spheres enlarged.

Search Algorithm and Signal Poses:

As the dimensions of the mechanism stated are not known, it is not possible to head for the signal poses directly or specifically. A fundamental step of the method consists of searching for a signal pose starting from a proximity pose. The search algorithm determines the way in which this search is carried out and the procedure for exceptional cases (i.e., reaching the workspace limits, no signal triggering after limited search, . . . ).

(For reasons of time, the search algorithm is always designed to be as simple as possible. Basically there is only one variation of the search algorithm: if the search space is 1-dimensional, a single (in general, the last) robot joint is moved by a finite possible interval until the signal is triggered; and searching for a (0-dimensional) point in a 2-dimensional variety is ruled out in this application context for reasons of efficiency. If the search space is 2 or more-dimensional, this case is reduced by changing the design to the 1-dimensional case. For this reason, according to the embodiment variation, the binary sensor is replaced by a sensor array of suitable dimension and size so that a 1-dimensional search movement of the last joint is sufficient.

If no signal pose is found, the proximity pose is discarded and, if necessary, a new one selected. However, in practice it is very seldom that no signal pose is found.

If a signal pose has been found, the associated measurement configuration, i.e. the current joint configuration of the mechanism, is stored in the computer system.

Parameter Identification:

On storing all measurement configurations, the measurement control program is terminated and the parameter identification program is called.

The term parameter identification is used to denote the algorithm (or computer program) which determines all calibration parameters from the raw data, namely from the totality of the joint configurations stored on release of the signal concerned, the estimates for the pose of the reference object in the space, and the estimates for the pose of the effector object relative to the hand and the characteristic equations.

The mathematical core of parameter identification is Newton's calculus of observations. The operation of the mathematical algorithms and their variations and the schematic identification of the necessary functional from the characteristic equations etc. is not described here. In Schröer's book, there is a complete introduction to this area of mathematics.

Put briefly, after the analysis of the possible values of all calibration parameters and the stored measurement configurations including the equalizing corrections, there results in the end only one single possible applicable mechanism and one single reference object pose that can trigger the signal in the registered joint configurations. It is the one mechanism which has actually been used for measurement. Only for this mechanism do the effector object poses, which result purely mathematically from the calibration parameter values and the stored measurement configurations, agree with the conditions which result from the shape of the calibration objects. Assume, for example, that a light plane is scanned by a photo sensor. In this case, the results of a purely mathematical calculation of the measurement poses will lie on one plane only if the true calibration parameter values were used and, for all other values, measurement poses will result which lie on irregularly surfaces and do not agree with the shape of the calibration object, namely a plane. The name-imparting adjustment to the exact shape of the calibration objects is carried out during parameter identification. In the literature (but not here) the term "parameter identification" is occasionally used as a synonym for the term "calibration".

To determine the n calibration parameters of the mechanism, at least $k=n$ measurements have to be carried out. To gain more error-damping redundancy, however, it is meaningful to carry out more than this number. In practical applications, k should be at least three time as great as n, preferably 10 times as great.

Mathematical identification requires that the measurement pose is identified 1 (T uniquely by the measurement configuration. If the mechanism to be calibrated is not a "kinematic chain" (robot) but a so-called multi-loop mechanism (e.g. a hexapod or "flight simulator"), some suitable passive (i.e. not actuated) joints, depending on the class of mechanism, are to be equipped with "joint encoders" for determination of the angles or prismatic lengths. If produced in quantity, the mechanism classes concerned are delivered with the necessary devices.

The real parameters of the real mechanism found in this manner which deviate from the manufacturer's information and into which the scaling factor determined have been incorporated is subsequently passed on to the mechanism controller for improving the pose accuracy or for more precise control.

Figure 24:
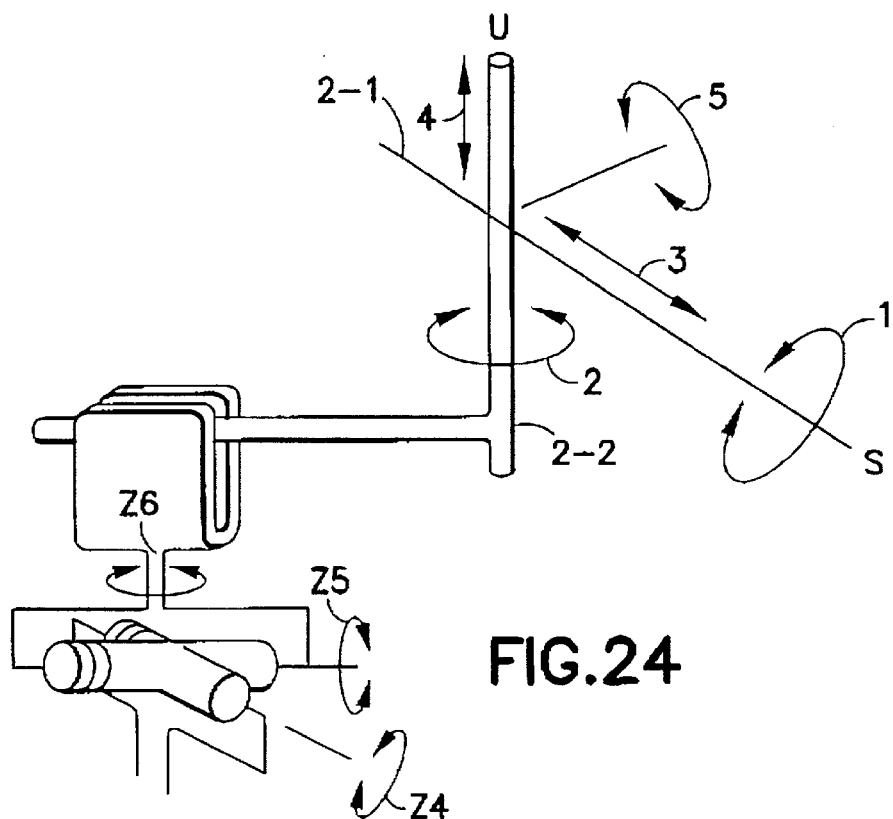
FIG. 24 is a schematic diagram showing the signal space with rotation axes and rotary and translatory directions of motion of an effector object in a signal pose.

In FIG. 24, a signal space is spanned by the plotted-in independent translation 4 along the axis of an effector object 2-2 (which has been designated by u like the corresponding direction vector) and the translation 3 along the axis s of a reference object 2-1, and by revolutions 2, 1 around these two axes and finally by revolutions around the common perpendicular 5 of u×s. If all measurement poses with respect to one of these dimensions is close to being constant, for example, with respect to the revolutions around u×s, the parameter identification will fail, i.e., if for all measurement poses, the series of angles between two calibration object axes is maintained close to being equal to a constant value u·s=constant.

Further details of the solution according to the present invention are described in the following: The necessity for identification of the scaling factor represents a significant difference between shape-adjusting and traditional calibration methods. In the latter, the identification of a scaling factor is always contained implicitly in the calibration method because of the use of traditional precision measuring instruments and this problem requires no separate consideration.

If in the basic form of shape-adjusting methods only one reference and effector object is used and no length standard or reference length included in the calibration, it is impossible to determine the absolute size of the mechanism. This observation may be found in the literature on the state of the art. In this case, the parameter identification algorithm may only terminate if an arbitrary length parameter—specifying a displacement rather than a rotation—is set and held constant by an arbitrary (estimated) value $l_i'$ without being identified because, otherwise, the "minimality" of the mechanism model is violated according to Schröer. As a result of the parameter identification modified in this manner, the relationships of the length parameters of the mechanism to each other are obtained precisely but not their absolute size. This case of parameter identification will be denoted unscaled (parameter) identification. The correct (approximate) values for the totality of the length parameters result after unscaled identification from a multiplication of all obtained length parameters $l_i'$ by a uniquely defined, common factor s which is designated as the scaling factor. If $l_i$ designates the correct, sought parameter value, then $l_i = s * l_i'$ applies.

To determine the scaling factor, the shape-adjusting method according to the present invention requires no measurement of certain lengths in the conventional sense but carries out an adjustment using a known length standard the dimensions of which are to be selected suitably. Starting from unscaled identification, two steps are performed:

i) the mechanism includes a length standard in the calibration by touching two or more (end) points of the length standard with the effector object which in the simplest case have a known distance d, and ii) from the associated joint configurations, a distance results arithmetically on the basis of the unscaled parameter values which is designated by d'. $d/d' = s = l_i/l_i'$ must apply and from this the previously unknown scaling factor s or the true value $l_i = d * l_i'/d'$ can be calculated.

Due to the nature of the method used, the value d, measured by conventional methods and generally identified once during the manufacture of the calibration system and before its practical deployment, is generally afflicted with an error ε. The value ε is usually independent of the size of the length standard. Consequently, instead of the correct value $l_i$, the value $(d+ε)*l_i'/d'$ is obtained and the error is $ε*(l_i'/d')$. If the factor $(l_i'/d')$ is smaller than 1, error damping is obtained. Not only the measuring errors of conventional measurement of the length standard are carried over and introduced into the length parameters resulting from parameter identification but also, quite analogously, above all those errors which arise inevitably during shape-adjusting calibration or in scanning the length standard. To obtain as good an error damping as possible, it is obviously sufficient to select the length standard d or the d' arising in $ε*(l_i'/d')$ as large as the remaining ancillary conditions of the method, e.g. the attainability of the measurement poses, allow. The overall method functions also for length standards which are smaller than Δ/6 but errors are disadvantageously amplified.

The two primary variants will be explained later in the examples.

The parameter identification does not necessarily have to be divided into an unscaled part and a separate identification of the scaling factor.

To improve the result, more than one measurement will be carried out in the first step for determining a scaling factor, i.e., step i), on each side of the length standard. In this manner, two series of poses, A and B, are obtained and these can, for example, differ in their orientation. The quantity of comparison d' is identified by mean value calculation which contributes to error damping. If the length standards are parallel, longitudinal objects, the two pose sets can also differ in their position. In this case, not the distances between the individual pose pairs are used as comparison quantities but, through mathematical determination of the orientation of the objects and subsequent determination of the mathematical distance between the two objects, the relevant comparison magnitude d' is obtained from which the scaling factor s=d/d' with the already known d results.

In accordance with the state of the art, only individual calibration objects have been used as length standards up to now, e.g. two sides of a cuboid or the diameter of a sphere, but not the exact distance between several calibration objects of the same type. An important doctrine of the method is the calculation of the mean value of the comparative measurements and the selection of the dimensions of the length standard for the purpose of error damping. The methods in accordance with the second variation are superior inasmuch as no separate comparative measurements are necessary for determination of the length standard but the identification of which is integrated in the calibration method. Each individual measurement thereby participates implicitly in the identification of the scaling factor through which a maximum averaging effect arises which increases the accuracy of the scaling factor. Apart from this, the number of the measurements necessary is reduced without loss of quality. The accuracy of the scaling factor determined depends decisively on the error damping, i.e. on the absolute length of the length standard used. A decisive advantage of the device and method variations pertaining to the invention and the use of two calibration objects of the same type, preferably identical, is that they always allow the use of very large length standards without impairing important practical aspects such as costs and the manufacturing expense of the calibration system or the preparatory or reworking expenditure for the calibration process or prevention of collision.

The overall strategy for the integrated, efficient and highly accurate identification of the scaling factor through the interaction of the various device and method components tuned to each another is a decisive component of the present invention.

The methods for determining the scaling factor through comparison on a length standard is shown in FIG. 1 where a length standard 6-1 is a parallel rod firmly mounted over a working area with two parallel end planes perpendicular to the working plane. The mechanism first of all touches the front end plane of the length standard with the effector object 6-2 aligned perpendicularly to the working areas, i.e. contact is established through a binary sensor. This contact is then repeated on the rear end plane of the length standard 6-1. From the two measurement configurations, the distance d' is calculated by the parameters of the mechanism determined and identified by comparison with the already known d of the scaling factor length standard 6-1. It is of advantage to place several points of measurement at each end of the length standard 6-1.

As shown in FIG. 1, the mechanism is connected to a control system 100 which includes a measurement control program 102, a parameter identification program 104, and a mechanism control program 106. The mechanism control program 106 is used to control movements of the mechanism. The measurement control program 102 measures the positions of the mechanism to determine its current position and orientation, i.e. pose. The parameter identification program 106 identifies calibration parameters as described above. The control system is used to control the mechanism to perform its required tasks such as, for example, measuring a length standard.

Figure 2:
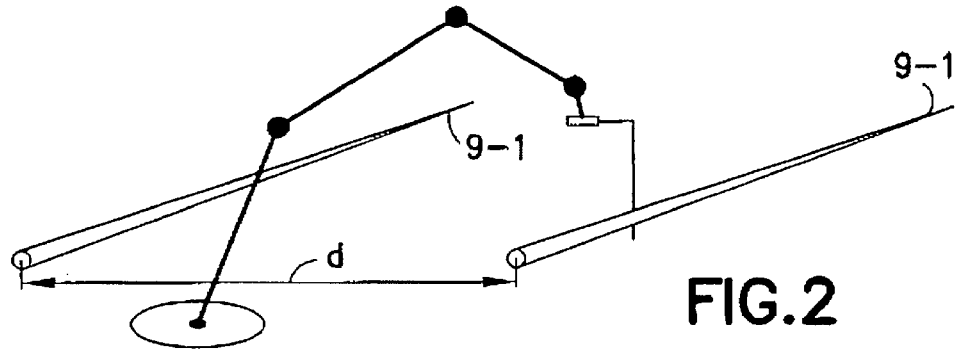
FIG. 2 is a schematic diagram showing the identification of the scaling factor with a mechanism and two reference objects of known distance.

The length standard required for determining the scaling factor may alternatively be designed according to another embodiment in FIG. 2, wherein two parallel reference objects 9-1 are mounted such that their distance d is unalterable and already known, or is measured precisely in advance. The measurement sequence is first of all recorded using the one reference object and then recorded using the other. Alternatively, the two measurement sequences may be interleaved. The scaling factor results then from a common parameter identification in the already mentioned manner. Important and of great advantage is that no separate measurement sequences have to recorded for determination of the length standard.

Figure 3:
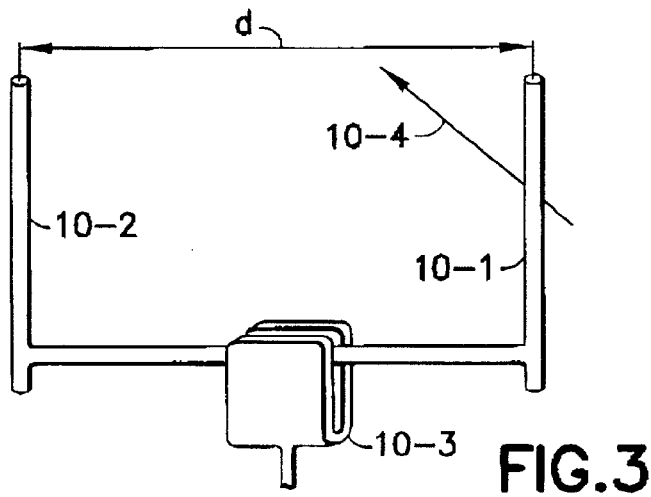
FIG. 3 is a schematic diagram showing a double effector object arranged on an effector of a mechanism for the scalar factor identification.

FIG. 3 shows that the length standard may also be created by two effector objects 10-1, 10-2, held by an effector 10-3 at a fixed known distance from each other. In FIG. 3, two identical interrupters comprising a left rod 10-2 and right rod 10-1 are arranged on the effector 10-3 at a known distance d. The detection of a reference object 10-4 with each of the two effector objects 10-1, 10-2 provides this distance whereby the two measurement sequences can be recorded arbitrarily interleaved. On the basis of the duality principle, this method of scaling factor identification follows from the previous section and vice versa.

Identification of the scaling factor is particularly simple under two pre-requisites: 1.) the exact dimensions of the mechanism including the scaling factor have been determined at a previous point of time by another method, usually by the manufacturer directly after manufacturing using a conventional precision measurement method or one of the above-mentioned methods, and the dimensions are known and 2.) since the last exact calibration, the majority of the links of the mechanism was subject to small deformation only.

If these prerequisites are fulfilled, the scaling factor may be identified according to shape-adjusting calibration and unscaled identification without additional measurement. Determination of the scaling factor is based on the observation that on deformation in customary industrial use—wear and tear up to slight collisions—certain dimensions or length relationships of rigid bodies remain invariant.

Figure 4:
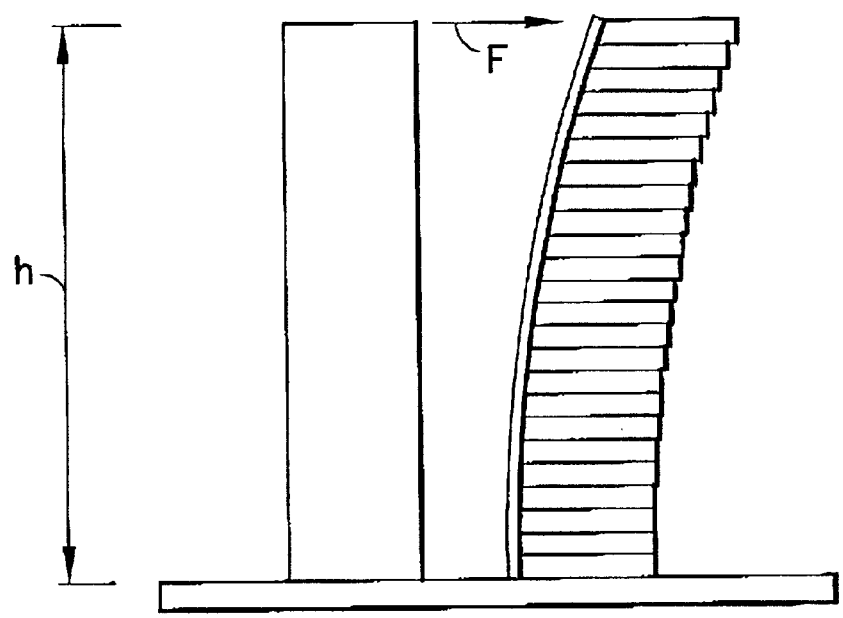
FIG. 4 is a schematic diagram showing the deformation of a beam on impact of a laterally directed power.

FIG. 4 represents schematically, for example, a slight deformation of a metal rod clamped on one side, for example, a robot arm segment, under the influence of a force F. It is shown in the experiment that the height h remains unaltered to a large extent as the deformation can be interpreted as parallel shifting of small body segments in the direction of the power (right figure part: "Bernoulli hypothesis"). This can be used as follows in accordance with the present invention:

(1) the constants for the various rigid links of the mechanism concerned, which is structured from various materials and may possess different deformability, are gained by means of practical tests starting with the Bernoulli hypothesis; and (2) the mechanism is calibrated exactly before starting up operation and the results are stored as desired values, for example, in the controller or on disk (these steps (1) and (2) are initial measures that are usually carried out by the manufacturer of the mechanism);

(3) after unscaled calibration, the constants of the individual links concerned are calculated by the calibration program and compared with the desired values stored. (normally, all relations of the desired values to the actual values of any arbitrary link lengths are identical and supply the common scaling factor of all links or of the complete mechanism, respectively $l_1/l_1'=l_2/l_2'=l_3/l_3'=\ldots =s$); and (4) if the mechanism possesses more than one link the desired dimensions of which are known—the identified pose of the reference object does not belong to the known desired dimensions—the special case of stronger non-compensable deformation can be recognised and corrected (steps (3) and (4) are performed by the user).

Generally, only a single link or a few links are affected by marked deformation (collision) but seldom all members equally. If, therefore, the individual scaling factors $l_i/l_i'$ are measured for all members individually, these will agree according to the above-mentioned prerequisite for the majority of the members—this common value is then the scaling factor of the mechanism. Scaling factors of individual members deviating from this indicate strong deformation of the member concerned. To be able to obtain correct dimensions of strongly deformed members, the lengths of the member obtained from unscaled identification can be multiplied by the previously determined scaling factor of the mechanism.

Figure 5:
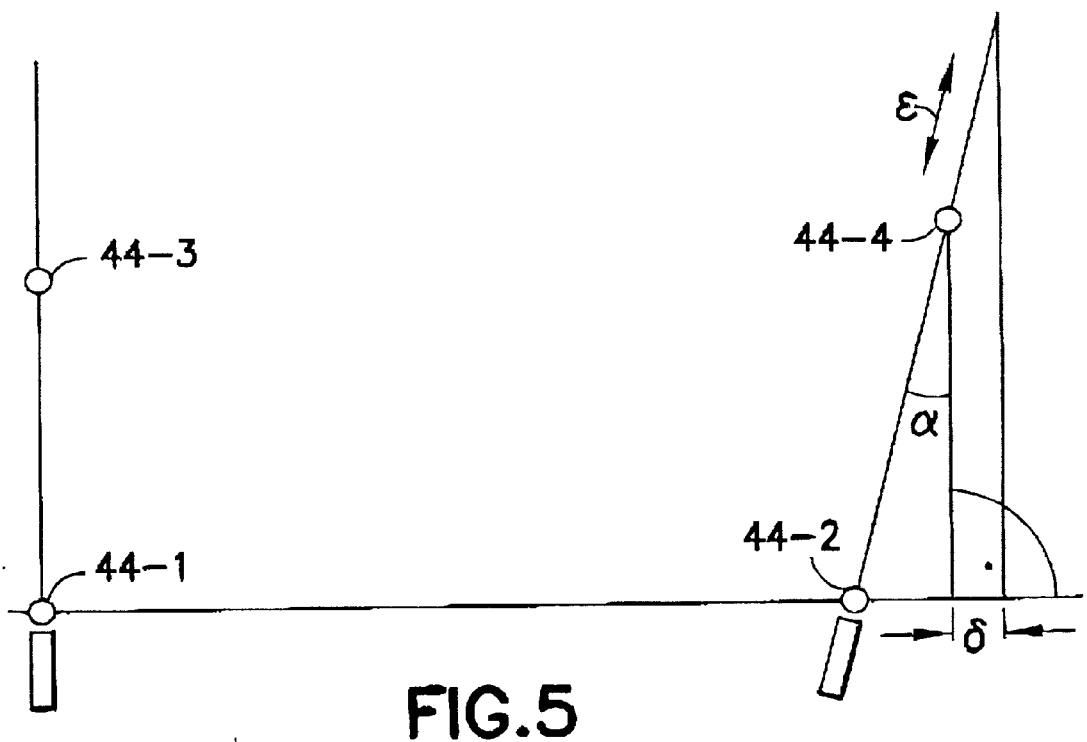
FIG. 5 is a schematic diagram showing the determination of pose accuracy with non-parallel calibration objects.

It can occur that two reference objects should ideally be parallel for the identification of the scaling factor but actually are not parallel. This is explained taking the example of two laser beams in accordance with FIG. 5 which are not exactly parallel. The example can be applied directly to other calibration objects, e.g. almost parallel planes.

To identify the actual lengths, a scaling factor has to be incorporated into the calibration or, the length parameters multiplied by such a factor after completion of the unscaled parameter identification. The scaling factor creates a connection between the reality and the unscaled model of the mechanism identified in the unscaled identification which is represented in the computer by the unscaled calibration parameters.

In the case of exactly parallel straight lines, e.g. laser beams, it is easy to create this connection. The distance is clearly defined and can be measured relatively easily. It is only necessary to pay attention to the fact that the measurement is taken along the shortest route and not along a diagonal connective line. If the beams, however, are skewed, measuring is decidedly more difficult. Elementary mathematical concepts and the standard distance cannot be applied in practice.

The connection between the model and reality may be created in that two points on the calibration objects, the exact position in the model of which is known, are measured in reality and the result transferred to the model. The only points of which the exact position is known both in the model and in reality are the signal poses. For industrial application, however, ancillary conditions have to be considered. The exact measurement should take place during manufacture of the calibration system after the two calibration objects or their generators have been mounted on a common support, unalterably and as parallel as possible. The scaling factor should, however, be identified locally at the purchaser/user. The signal poses can therefore not supply the required connection directly as they differ from robot to robot.

The method pertaining to the invention is distinguished by consideration of the practical ancillary conditions, little measuring effort and, above all, maximum error damping. The practical procedure is described with reference to FIG. 5. After production of the calibration system, the distance between any two arbitrary points on the beams which are easy to find again, e.g., the points 44-1 and 44-2, at which the laser beams are emitted from the laser supports, are first measured exactly using conventional precision measurement systems. Then, for periodical calibration at the purchaser/user locally, unscaled identification is carried out first of all through which the direction (unit) vectors of the beams are known exactly in the mathematical model.

After this, two signal poses 44-3 and 44-4 are selected on the beams.

The operator must then measure the distance between 44-1 and 44-3 as well as the distance between 44-2 and 44-4 using a simple measuring instrument with tolerances e.g. a meter rule, and the two measurement values are entered into the computer system. The computer system then multiplies the direction vectors by the distances determined by the operator and adds the resulting vectors to the signal pose points. In this way the position of the points 44-1 and 442 in the mathematical model is obtained exactly and, from this, it is possible to calculate the distance in the model. A value d results through calculation of the point distance and the scaling factor results from the known, true distance between d yielding s=d/d'.

As numerical example, assume the distance between 44-1 and 44-2 measured exactly after the manufacture and mounting of the laser in the laser support is exactly d=1000 mm. Assuming that an arithmetical distance of d'=990 mm results in the mathematical model, the scaling factor is equal to 1000/990. All identified length parameters of the mechanism are to be multiplied by this value.

Decisive for the method pertaining to the invention is the error damping. If the operator locally makes an error of $\epsilon$ in measuring the distance 44-2 to 44-4, then the depicted error $\delta$ is incorporated into the scaling factor. Let a be the angle between the perpendicular and the connecting straight line 44-1 and 44-2, then $\delta=\tan(\alpha)*\epsilon$. As $\alpha$ is approx. 0, $\tan(\alpha)$ will also be close to 0. $\delta$ always amounts only to a fraction of $\epsilon$. The method pertaining to the invention guarantees practically maximum error damping through this.

From the explanations of the scaling, it is clear to the specialist that in further development of the invention, the scaling factor only has to be identified exactly on first calibration and when the scaling in the case of re-calibration is determined from the comparison of known, selectable lengths of the mechanism which remain unalterable in customary industrial use.

Normally, a complete calibration phase seems to be necessary before an actual work step can be executed or when a partial re-calibration of the mechanisms is desired or after recognition of the fact that there is deviation of calibration parameters which were assumed to be correct. According to the present invention, the measurement sequence may be performed during the work phase of the mechanism. This may be achieved in that the calibration objects are structured such that the effector objects pass through signal poses with respect to the existing reference objects as often as possible during the execution of arbitrary desired movements.

Figure 6:
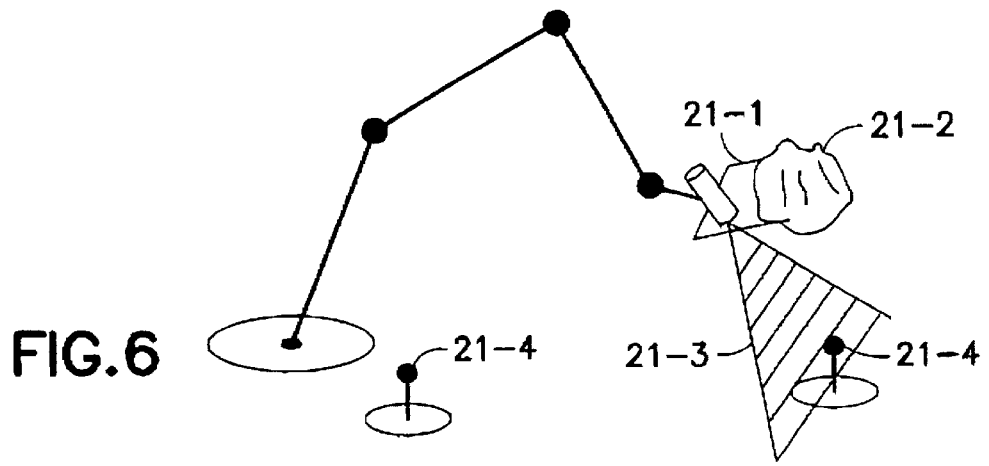
FIG. 6 is a schematic diagram showing the arrangement of an effector object on a mechanism and of an immaterial reference object for concurrent calibration according to an embodiment of the present invention

For example, an effector object may be permanently or temporarily attached to the mechanism in accordance with FIG. 6. The type of effector object is immaterial and may comprise a light plane 21-3 which does not hinder the execution of normal working steps, e.g., manipulation of the workpiece 21-2 with the effector comprising a robot pince 21-1, and at the same time allows the scanning of the reference objects, e.g. multiple point-shaped light sensors 21-4. During the execution of work movements of the mechanism, the values of the joint variables are recorded and stored whenever a signal configuration is reached without the work movement being influenced in any way. If enough signals are triggered, parameter identification may be performed. Additional movements of the mechanism, possibly during sufficiently long work breaks, may be triggered, for example, to extend the measurement sequence taken up during the work process by such measurement configurations which are necessary for the fulfilment of the criteria for measurement sequences described above.

For accelerating the identification and/or for improvement of the measurement results, the joints of the mechanism may also be formed in groups which are connected in the kinematic-physical sense and are identified successively and separately from another. In a customary robot one of the groups may include the joints 1, 2 and 3, counted from the basis, and a second of the groups may include the last three joints. Then, for each of the groups, an individual separate measurement sequence is recorded. For example, first of all the joints 4, 5 and 6 are held fixed and the joints 1, 2, 3 moved. If the chain from the $4^{th}$ joint to the effector is regarded as a single, still to be identified rigid body, the number of calibration parameters to be identified drops almost by half in comparison to the original robot. All embodiments of the calibration method pertaining to the invention provide, in this case, unaltered correct results. After parameter identification of the first group of joints 1, 2 and 3, these joints are locked and the joints 4, 5, 6 of the second group identified in the same manner. The results of the previous identification can be compared with these results, i.e. the chain of the joints 1, 2 and 3 may, during identification of the second group, be regarded as exactly known rigid bodies. After identification of the second group, the results can also be compared with respect to the chain 1, 2, 3. As end result, all sought calibration parameters are obtained. The advantages of this decoupling are that the identification result is improved at simultaneous reduction of the measurement work. If superfluous disjunctive parameters are identified successively, for example, 2 times 24, this requires significantly fewer measurements and supplies far better results than when 40 parameters have to be identified simultaneously. Furthermore, causes of error can be assigned to the groups separately. The error sources can be identified better in this manner.

This process can be continued up to decoupling and separate measurement of a single joint.

For eliminating the measurement error arising through threshold value and signal delay, a single actuated free-moving joint of the mechanism is moved until a change in the condition of the binary signals of the measurement pose is detected. The movement is continued until the signal is changed back to the starting condition. The two joint values to which the signal changes—expressed more simply: "switching values" or "switching angles" or "switching lengths", etc., according to the type of joint—are registered. Now the joint is moved in the opposite direction and the switching values are registered again. From the mean value between the switching values, conclusions may be drawn, depending on the embodiment of the method, which in suitable cases enable the elimination of threshold value and signal delay error.

Figures 7A, 7B, 7C:
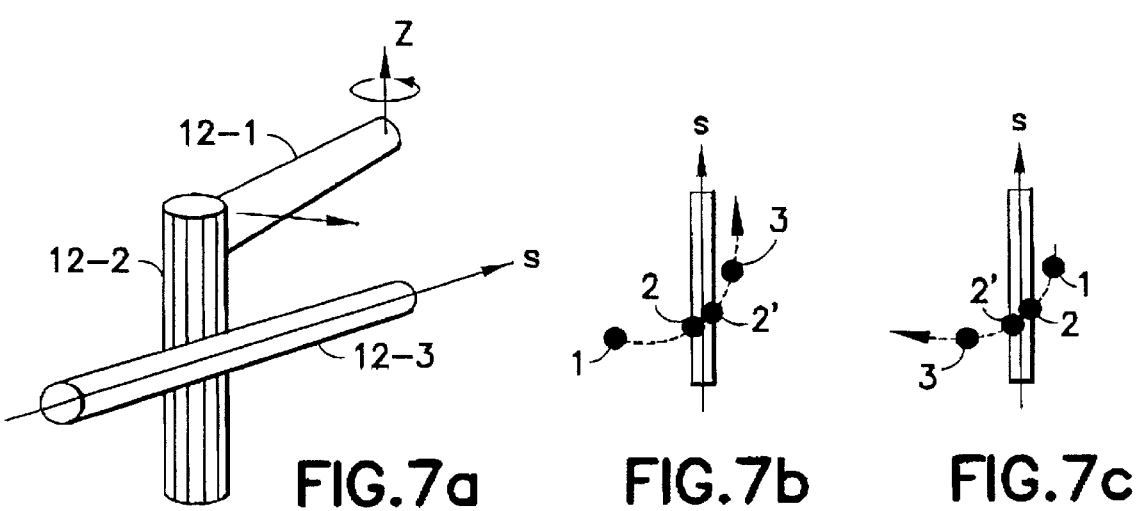

FIG. 7a shows the situation in which the last joint of the mechanism is assumed to be revolute (rotation axis z). For recording the measuring point, the effector object with a boom 12-1 and an interrupter rod 12-2 is rotated around z. FIG. 7b is a view from above of the boom and interrupter rod of FIG. 7a showing various angles of rotation 1, 2, 2', 3 occupied successively. Entry takes place here from the left, exit to the right. As soon as the interruption of 12-1 the reference object, e.g. laser beam 12-3, is detected during the movement (entry pose 2), this joint angle (switching angle) is recorded. After further movement, it is detected in an exit pose 2' that the interruption no longer takes place. Normally the entry pose 2 and the exit pose 2' do not coincide. As long as entry and exit are symmetrical with respect to the centre axis s of the beam, their mean value results in the desired measurement angle. To compensate hysteresis errors in the entry and exit, the measurement can take place in a second run-through in the opposite direction of rotation as presented in FIG. 7c (entry from the right, exit from the left). The sought value—average of the central axes of the laser and interrupter rod—is then the mean value of the two mean values of the first and second run-through, i.e. the mean value from four values. In principle, it is possible to control the effector via any desired prescribed trajectory, e.g. a straight line, and to register the two signal changes. In doing so, several joints are moved in general, however, this has the decisive disadvantage of being inaccurate (axis synchronisation error). For this reason, not any joint is moved but advantageously only the last joint of the chain. Decisive is that the mean value or a sufficiently easily calculable function of the signal angle provides a practically utilisable result, i.e. leads to an equation the solution of which can be determined and which improves the accuracy of measurement.

Figures 8A, 8B:
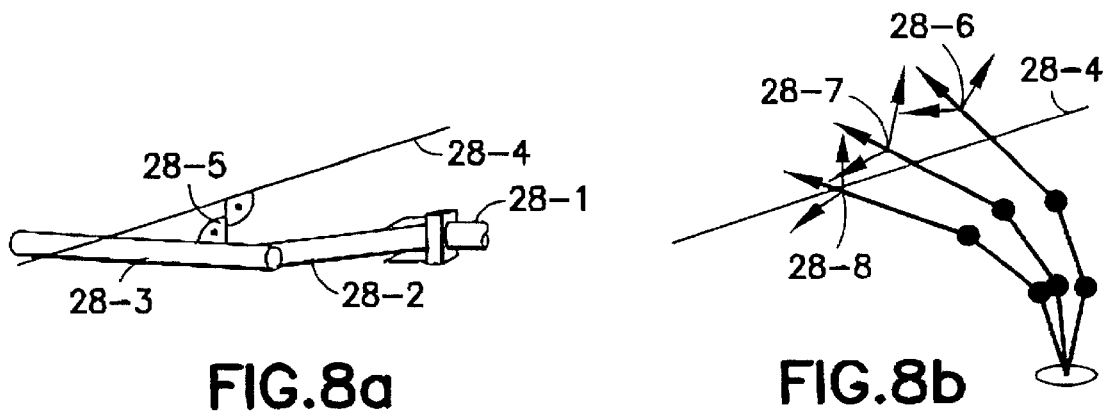
FIGS. 8a and 8b are schematic diagrams showing a beam and interrupter fastened to an effector for defining the residue and of the deviation of desired and actual pose with respect to the reference object.

After identification of all parameters, the pose information which is gained during the course of the procedure is used in accordance with the invention for the training of an adaptive learning system "LS" or neural network. FIG. 8a shows an extension arm 28-2 and an interrupter 28-3 fastened on an effector 28-1 for interrupting a light beam 28-4. The network learns the difference 28-5 between a desired target pose and the actual pose deviating from this which can result after calibration because the mechanism parameters are still afflicted with tolerance. Depending on the type and generalisation ability of the learning system, information is also used about the pose reached. The actual pose may be identified by even more precise supplementary measurement methods pertaining to the present invention. After the learning phase, the learning system then supplies a multidimensional vector for each joint configuration which states where the correct effector pose or position relative to that calculated from the identified parameters lies.

The following are depicted in FIG. 8b:
correct target pose (28-8)
pose reached without calibration (28-6)
pose reached after calibration (28-7)
pose reached after calibration and error compensation through a learning system (close to 28-8)
without calibration and only with error calibration through a learning system (close to 28-7)

It is of significance here that the LS does not have to learn the inverse kinematics of the mechanism or those deviations which have already been identified by means of shape-adjusting calibration but only deviations of position which are owed to the errors remaining after shape-adjusting calibration, i.e. measurement and model error. In other words, the LS learns only the model error and no additional errors, and concentrates fully on the pose deviations caused by the model error. Formulated conversely: if the learning system is used for identifying rough errors which can be modelled, little accuracy is achieved even with a lot of training data. Only through the previous (shape-adjusting) calibration is the task of the learning system reduced to its actual capability and the actual problem: the registration of smaller residue deviations, difficult to model, which remain after shape-adjusting calibration. Efficient elimination of remaining errors—and not the principle use of a learning system for calibration—is a major object of the present invention.

Such differential error compensation may be used directly for the control of the mechanism in that each component of the correction vector for the joint angles which is supplied by the neural network is added to the corresponding component of the joint value vector calculated by the controller on the basis of the identified parameters.

Figure 9:
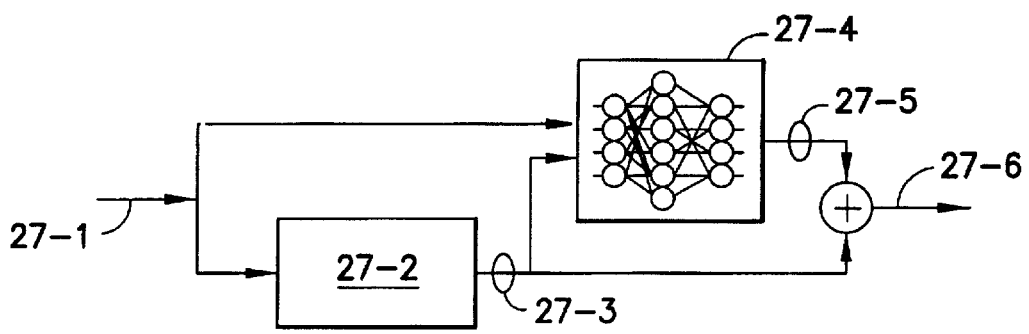
FIG. 9 is a block diagram showing a joint value controller with a neural network for compensation of calibration errors according to the present invention.

FIG. 9 depicts an error compensating joint control for the mechanism. A desired value 27-1 of a pose, e.g. given in Cartesian coordinates, is transferred to a kinematic module 27-2 which—based, for example, on kinematic parameters resulting from the calibration—calculates the associated joint configuration 27-3 of the mechanism. The associated joint configuration 27-3 is not used directly for the adjustment of the mechanism but is still modified by the learning system 27-4, i.e. a correction value 27-5 is calculated from the desired value 27-1 and the associated joint configuration 27-3, to reach the result 27-5 for the adjustment of the joints. The new joint configuration 27-6 is reached using the associated joint configuration 27-3 and the correction value 27-5.

Figure 26:
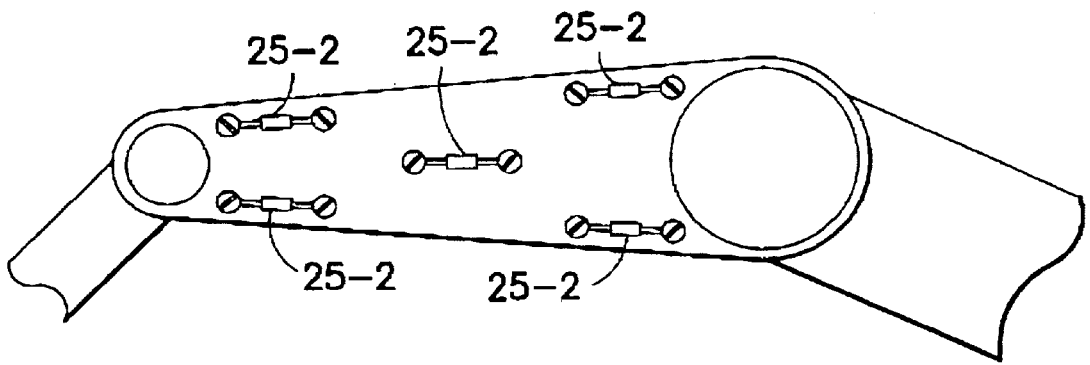
FIG. 26 is a schematic view of a section of an effector having temperature sensors.
Figure 27A:
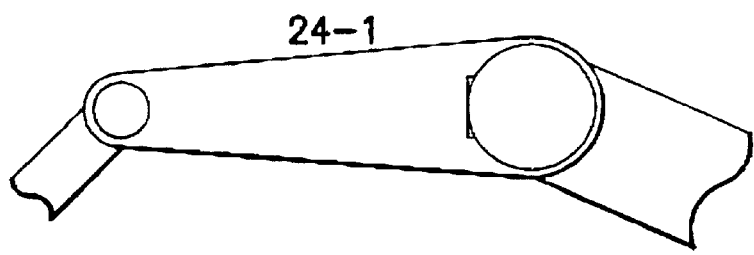
FIGS. 27a and 27b are schematic views showing a section of an effector having a torque sensor in unloaded and loaded positions.
Figure 27B:
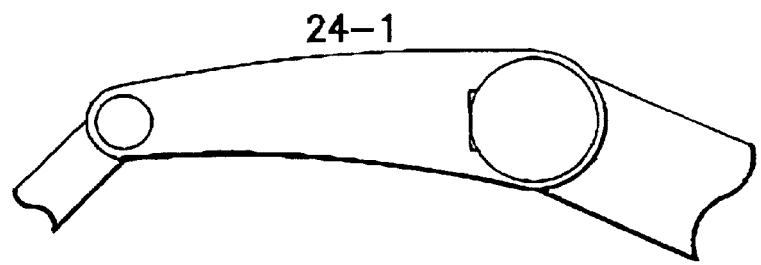

For further improvement of the result pertaining to the invention, readings from sensors can be used which sense torsion or other parameters such as temperatures. Typical temperature sensors 25-2 are shown in FIG. 26 and a torsion sensor 24-1 is shown in a relaxed state in FIG. 27a and under torsion in FIG. 27b.

New embodiments of the method pertaining to the present invention may be derived from known embodiments through interchange of the effector and reference objects as explained in the example below. The new embodiments may, in spite of their structural relationship, possess completely different technological advantages and disadvantages relative to the original embodiment, e.g. with regard to prevention of collision, weight of effector objects, accuracy, etc. The characteristic equation of an embodiment, obtained from an interchange, results through the interchange of variables from the original embodiment.

Figure 10:
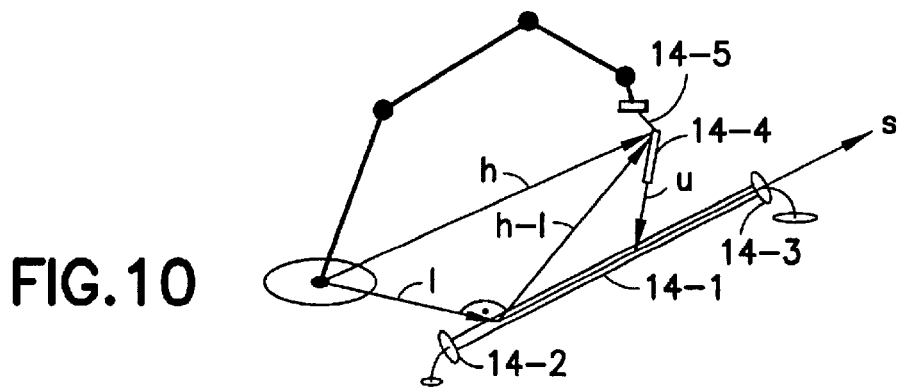
FIG. 10 is a schematic diagram showing an embodiment with a laser and photo detector as a reference object according to the present invention.

As pairs of reference or effector objects, quite different embodiments are conceivable:
i) FIG. 10 shows an embodiment of the present invention in which the reference object is a thin beam of an electromagnetic wave, e.g. a laser beam 14-1 generated by a laser 14-2, which intersects the workspace of the mechanism in any desired set-up. At a sufficient distance from the laser 14-2, a photo detector 14-3 is fastened which is reached by the laser beam, initially unhindered. The effector object is an interrupter rod fastened to an extension arm 14-5 and has the task of hindering the laser beam in propagating in the direction of the photo detector when it is put into a corresponding situation by the mechanism. To guarantee the fulfilment of the criteria for the selection of the measurement sequence, the interrupter rod has to have sufficient length. For a customary, medium-sized industrial robot, the minimum interrupter length is approximately 100 mm. In reality, interrupters having lengths of 150 mm and greater obtain results which fulfil industrial requirements. The interrupter rod must be manufactured as an exactly straight object.

Figures 11A, 11B:
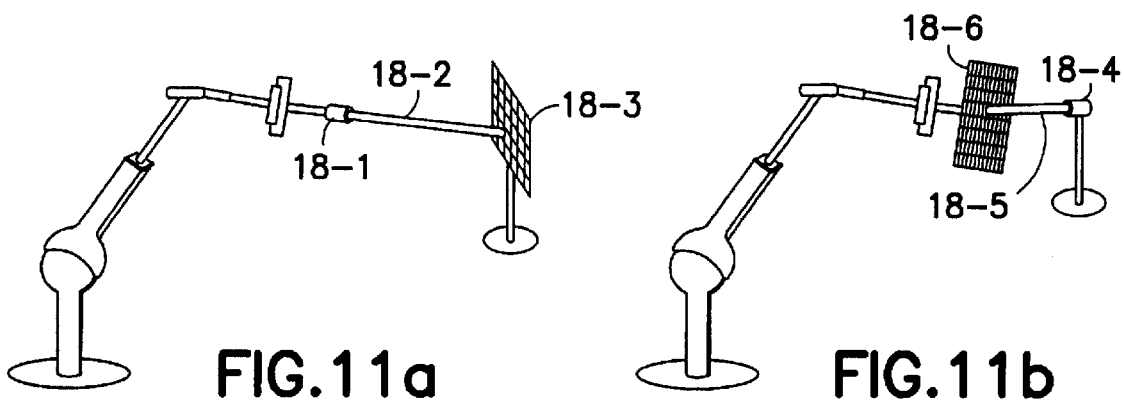
FIGS. 11a and 11b are schematic diagrams showing an embodiment of the present invention with a laser and a matrix camera which are interchangeable as either effector object and reference object.

A variation of this embodiment consists of a laser beam which is used as one of the calibration objects and the other one consists of a one-dimensional (straight) binary light sensor. Technically, the latter could be realised through a vector of photo detectors. In this case, a signal is triggered when the laser beam illuminates one of the photo detectors. The characteristic equation is identical in both cases. The vectors 1, h, h-l, u, s define the pose of the calibration object and will appear in the equation.

ii) instead of the light beam, a thin taut wire may be used which is contacted by the effector object the contact to which is, for example, detected electronically. For increasing the accuracy, the triggering of the signal may be defined as interruption of the electrical contact when the contact rod is taken from the wire.

iii) the effector in accordance with FIG. 11*a* is equipped with a directed radiation source 18-1 (a customary laser beam) as effector object. In a very simple embodiment, the reference object may be a point-shaped sensor. As described above, the signal is triggered when the beam is registered on the sensor. This method differs inasmuch from all previous ones as it is, assuming a proximity pose, difficult to find a signal pose without feedback as a point within a 2-dimensional manifold has to be found. For this reason, instead of a point-shaped binary sensor, a plane area 18-3 fitted with sensors is used as reference object in the embodiment of FIG. 11*a*. On the other hand, FIG. 11*b* shows the plane area 18-6 representing the effector object and the laser 18-4 with beam 18-5 representing the reference object. The plane area 18-6 is designed as CCD matrix or positioning sensing device (PSD). Further processing of the signal corresponds exactly to other methods. The advantage of the method with an increased sensor dimension is the acceleration of the calibration process. At each measurement or measurement configuration, two characteristic equations are obtained meaning consequently that only half of the measurements are required.

Figure 12:
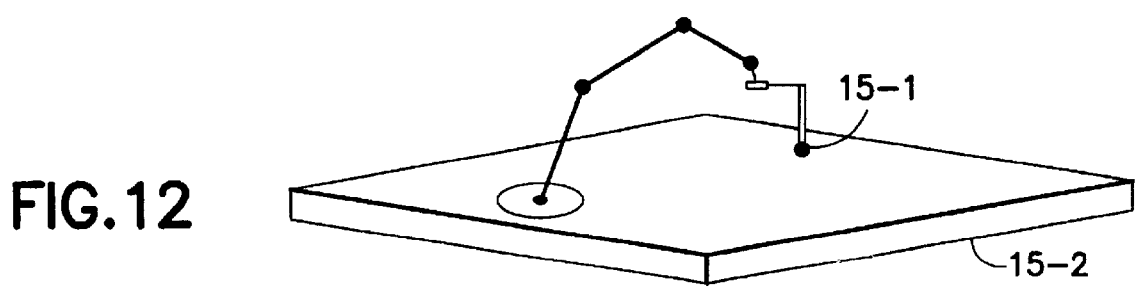
FIG. 12 is a schematic diagram showing an embodiment of the present invention comprising a plate as a reference object and electrically conductive rod as an effector object.
Figure 13:
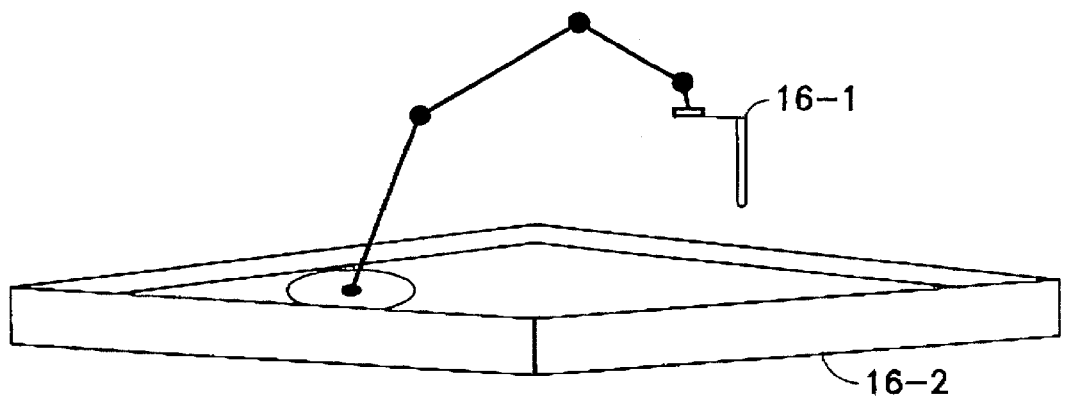
FIG. 13 is a schematic diagram showing an embodiment of the present invention with a liquid surface in a tub as a reference object.
Figure 14A:
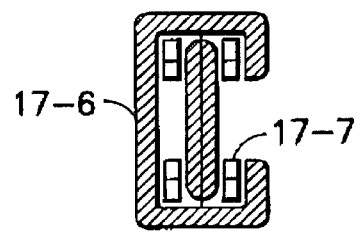
FIG. 14a is a sectional view of the telescope system of FIG. 14.
Figure 14:
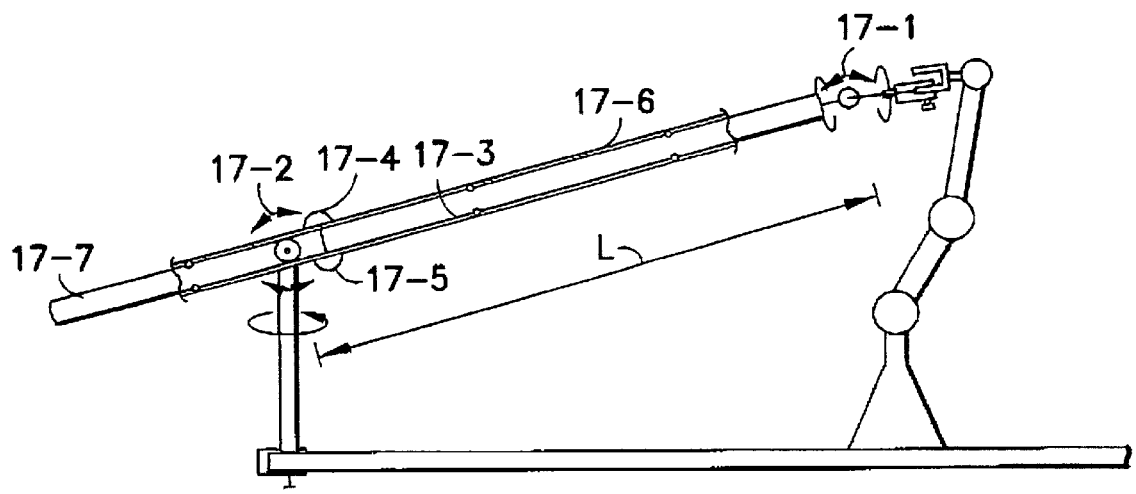
FIG. 14 is a schematic diagram showing an embodiment of the present invention with a telescope system.
Figure 15:
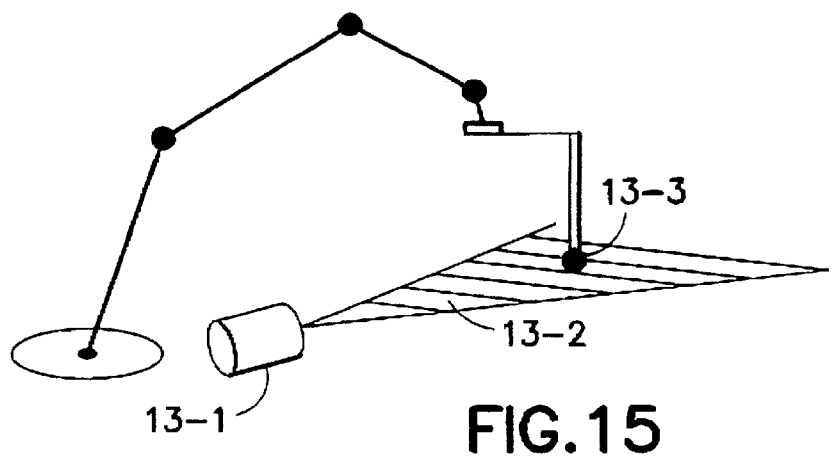
FIG. 15 is a schematic diagram showing an embodiment of the present invention with a light plane and collective lens as calibration objects.

At run-time, i.e. after completion of calibration, the hardware from the area sensor and beam source is used to lead the robot. That is, the reference object and the effector object are arranged such that all poses of the robot during its work phase are signal poses. The robot "rides" in a way on a laser beam. This is utilised to guarantee particularly precise movements and can, apart from this, be used to recognise model error and to train an adaptable system.

iv) FIG. 12 shows an embodiment with an exactly planar material plate 15-2 used as a reference object whereby no combination of exactly aligned plates are required. The effector object is a highly elastic (steel) rod 15-1 which is sphere-shaped at its end. This characteristic avoids the disadvantages of sharp effector objects. The contact between sensor and plate may, for example, take place electrically. Accordingly, the sphere and the plate must be conductive. In addition, identification of the scaling factor by picking off known edge lengths of the plate is possible. If the edge poses are determined in the sense of the method by "picking up", they do not have to be exactly parallel for identification of the scaling factor and only two opposite edges have to be straight. It suffices if one of the lengths of the edges is known exactly. The longer the length of the edge, the greater the error damping concerned in the determination of the scaling factor. The greater the surface of the plate, the better it is for fulfilling the criteria for the selection of the measurement sequence.

v) Alternatively, a liquid level is used in a tub 16-2 as a reference object in accordance with the embodiment of FIG. 13. The surface of the liquid should smooth over sufficiently quickly after contact with the effector object which is shaped as a rod 16-1. Consequently, provision is to be made for adequate damping. Contact with the effector object may also be detected here, for example, electrically. The identification of the scaling factor is possible through picking up the distance of the internal edges of the tub. The edges need neither to be exactly parallel nor straight. It is sufficient if one of the edge lengths is known exactly. After each individual measurement, the residue liquid on the effector has to be wiped off.

vi) In the embodiment of FIGS. 14 and 14*a*, a telescope-type precision mechanism is used which generates a kinematic loop together with the mechanism to be calibrated. The pipe-shaped internal telescope part 17-7 may be moved in a wide range towards the external pipe 17-6 (see FIG. 14*a*), i.e. both form a prismatic joint. A certain submergence depth of the internal part into the external part may be detected precisely as a binary sensor reacts as soon as it is reached. This sensor may be triggered, for example, by an electrical contact or bore 17-3 in the internal rod which at the submergence depth (and only there) releases a light barrier from the light transmitter 17-4 and light detector 17-5. For carrying out calibration, the telescope part 17-7 is attached to the mechanism via a spherical joint 17-1, the external part is mounted at the distance L via a universal joint 17-2 at a point which is fixed in reference to the coordinate system of the mechanism. In this manner, the point is reached at which, just as with the other examples when the mechanism is moved, a signal pose is detected whenever the effector object 17-7 and reference object 17-6 are located at a certain distance to each other. The measurement or signal poses are selected according to the rules pertaining to the invention. In difference to all other embodiments, the calibration objects here are in permanent contact which in most cases would exclude any concurrent calibration. This has the advantage, however, that recognition of the signal event can take place with a very high degree of precision and the necessity for error elimination, which is partly required in case of the other examples, does not exist.

vii) In FIG. 15, a fan-shaped plane 13-2 is used as the reference object and consists of electromagnetic waves, e.g. light, which, for example, is generated by a laser 13-1 fitted with a suitable optical system or a rotating laser, or by a combination of laser and a rotating polygon mirror. The effector object with a detector 13-3 is in a position to recognise the moment at which it touches upon the light plane 13-2. To guarantee that the signal space assumes maximum dimension, it must be possible to recognise with certainty, also in the case of detectors tilted towards the light plane, when the detector contacts the light plane. As long as a detector with a certain directional sensitivity is used, it can be necessary to fit this with a collective lens which, even at pronounced tilt, directs sufficient light from the light plane to the actual detection element. It is recommended that this lens has the shape of a sphere with known radius on its surface, because this simplifies the mathematics of the parameter identification.

The scaling factor may be identified analogously by one of the methods stated, e.g. by a second light plane with a known distance to the first or by a second light detector mounted at a known distance to the first.

Figure 16:
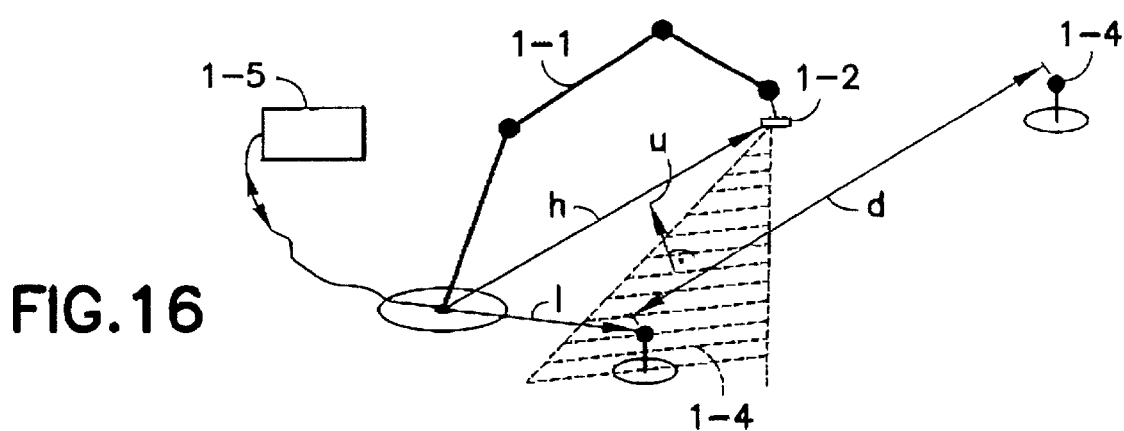
FIG. 16 is a schematic diagram an embodiment of the method with calibration objects including a light plane/radiation plane and two point-shaped sensors/photo detectors.

Alternatively, FIG. 16 shows point-shaped light-detectors 1-4 used as reference objects, the reception characteristic of which are optimised for minimum disturbance. As effector object, a light plane 1-3, for example, generated by a laser 1-2 on effector 1-1 by means of a line-lens or a rotating (polygon) mirror is used. The illumination of the photo detectors by the light plane defines the signal poses. The photo detectors are located at a large, known distance d and this enables, by means of the computer system 1-5, exact determination of the scaling factor with greater error damping whereby the vectors h, h-1, l, u are used for the pose calculation of the objects. The orientation of the photo detectors does not need to be aligned relative to each other due to their point-shapedness.

viii) Traditional methods of measurement such as, for example, the parallactic double-image tacheometry, known from land surveying, normally have traditional measurements as their basis. From these, shape-adjusting calibration methods can be derived for special cases.

Figure 17:
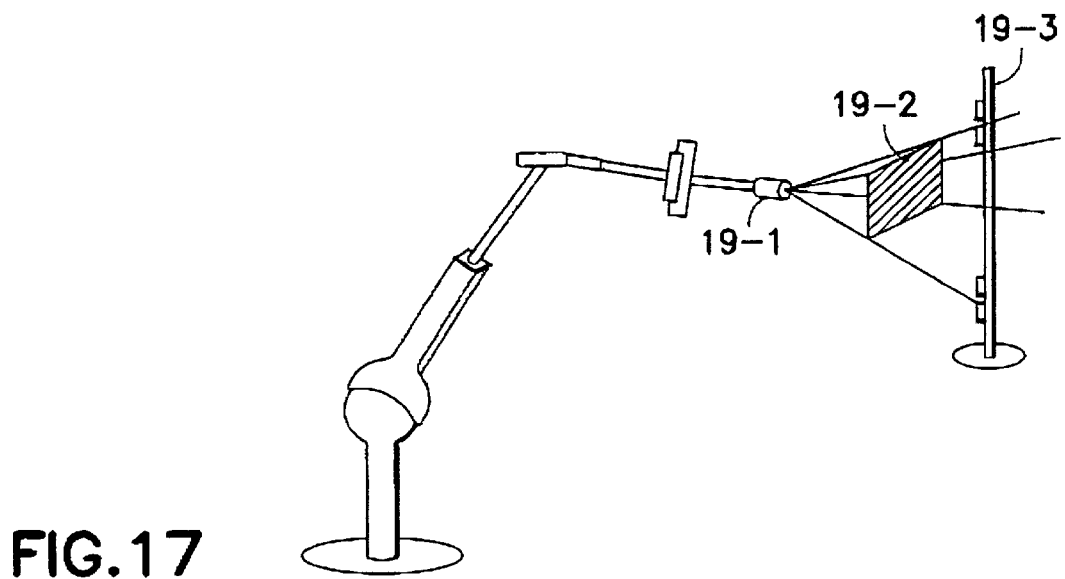
FIG. 17 is a schematic diagram showing an embodiment of the present invention with a light wedge and photo sensors as calibration objects.

Application of the above-mentioned land surveying method takes place, for example, if, in accordance with FIG. 17, a source 19-1 generates a radiance or light wedge 19-2 and the reference objects are photo detectors 19-3. Registration takes place then when the light cone illuminates the latter and when it becomes dark again. For, example, two pairs of point-shaped photo detectors 19-3 are used whereby the detectors of each pair have to be direct neighbours and the pairs are arranged at a greater collinear distance from each other. The signal is then triggered exactly when the light wedge illuminates the two "inner" detectors and the outer ones remain dark. This arrangement surmounts typical disadvantages of the state of the art by the use of sensors of a higher dimension, in this case pairs of shorter collinear-mounted lines of sensors at a known distance.

If the calibration process is supposed to take place alternately in between the work phases of the mechanism without the necessity for manual intervention, the calibration environment may be created automatically. The mechanism grips the effector object automatically by a suitable motion. If required, the mechanism may also grip the reference objects and the reference object or objects into a suitable position. These steps may be achieved by storing the calibration objects in a suitably shaped fixture within the working area of the mechanism.

Figure 18:
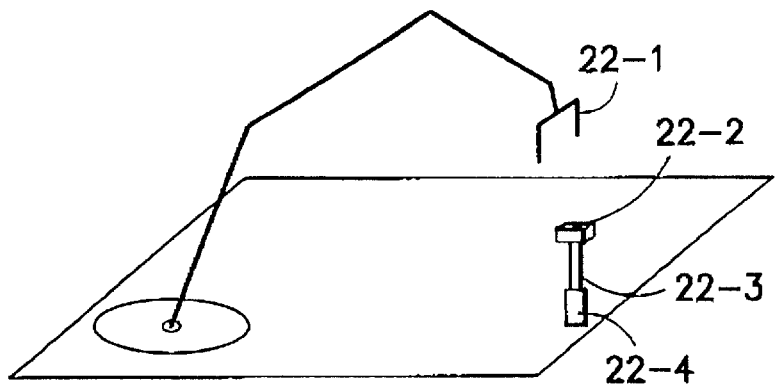
FIG. 18 is a schematic diagram showing an embodiment of the present invention for selectively picking up the effector object by the effector of the mechanism.

In accordance with FIG. 18, the calibration objects are connected mechanically and rigidly to an adapter 22-2 so that they can be picked up with the effector. The adapter must be in a spatial position such that it can be picked up by the effector, a gripper 22-1. The gripping of the effector object 22-3 and/or also the reference object is alleviated if the effector object lies in a single, certain pose in a holding fixture 22-4 as then access to this pose through the effector may be easily programmed.

To save space, to avoid planning and installation expenditure and possibly also to protect the calibration objects, the calibration objects may be integrated firmly in the mechanism.

Figure 19A:
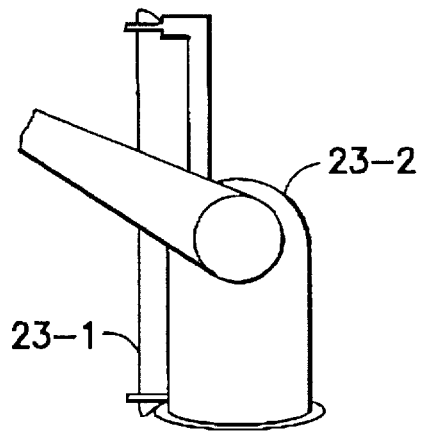
FIGS. 19a and 19b are schematic diagrams of a reference object as part of the mechanism.
Figure 19B:
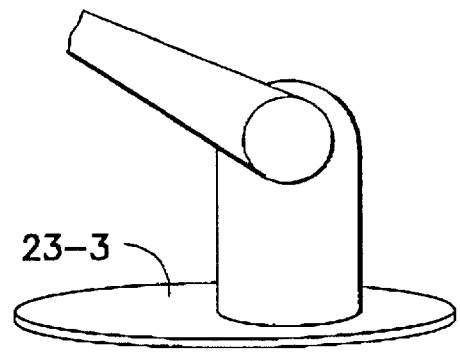

FIGS. 19a and 19b show two possibilities for the reference object to become an integral part of the mechanism. In FIG. 19a, the reference object is an intangible reference object, e.g. laser ray 23-1, and in FIG. 19b, the reference object is a material reference object, e.g. a plane metal plate 23-3. It must be ensured that the reference object has sufficient spatial expansion for each calibration method and that it is connected with the mechanism in a position allowing undisturbed continuation of the calibration procedure with all specific measurement configurations. If constructive reasons prevent connection of the reference object rigidly with the base 23-2 of the mechanism, the reference object may be attached at another point of the mechanism. If, however, looking from the base, it is attached behind one or several joints, calibration for this joint can no longer take place.

If the selected calibration method allows an effector object to be used which, for its part does not, or only insignificantly, restrict the work space or the scope of work of the mechanism, then the effector object can be mounted firmly, e.g. on the effector or in front of it, ie. on the— viewed from the base—last joint of the chain (see FIG. 6). The effector object then stays there throughout the complete duration of use of the mechanism and is used appropriately during the calibration process. In addition to savings in the setting-up time, this also has the advantage that the kinematic transformation from the last joint to the effector object is known and constant and does not have to be identified during measurement as an unknown parameter.

Alternatively, only parts of the effector objects may be put down and taken up again. For example, the effector object may comprise a camera before which, for calibration purposes or for interpolation—which will be explained subsequently—a transparent diffuser disc has been arranged. In this example, only the diffuser may be discarded temporarily. Accordingly, the camera may be used for traditional sensory purposes. If the removal of the diffuser disc takes place without the camera being subject to vibration, the camera is left in a position as a calibrated camera.

The disadvantages of using of point-shaped sensors may be avoided if, instead, flat sensors or arrays of sensors are used. For a sensor array of which the resolution is the same throughout its whole area, the expected signal may be registered at each measurement of the measurement sequence by arbitrary sensors of the array and processed after apparent modification of the mathematical identification process. The resulting advantages are in detail: increase in the precision due to the elimination of threshold value and signal delay errors, elimination of "discretization errors", elimination of "hysteresis" or "control tolerance", elimination of the necessity for multiple measurements for the purpose of error damping, multiple acceleration of the measurement process due to the cancellation of threshold value elimination and signal delay elimination, increase in precision and simplification of the scaling factor identification.

The increase in dimension alters nothing in the function principle of the shape-adjusting measurement. Each individual measurement may still be reduced to an individual sensor even if the latter differs from case to case. Consequently, when using higher dimensional sensors, the characteristic equation defining the calibration method and the criteria for the selection of the measurement sequence remain unaltered.

The sensor array may have different resolutions. Sensors with low resolution (coarse area) may be grouped around a core with a maximum sensor density (precision area). The actual measurement takes place only in the precision area. Only poses detected by the precision area are defined as signal poses. The job of the coarse area consists exclusively of guiding the effector object quickly to the precision area, i.e. to a signal pose ("capture" of the effector object). In the technical realisation of radiation-based methods, high-resolution detector lines or matrices, e.g. CCD arrays, are used in the precision area, in the coarse area, large-area photo elements are used.

These statements are true analogously for sensors which possess even resolution but due to errors—e.g. lens errors—only work precisely in a known partial area as presented in two examples:

a) In the case of a one-dimensional precision area which is realised by a CCD line, the coarse area may be formed by one rectangular-shaped photo element of known dimensions at each of the longitudinal ends of the CCD line.

b) In the case of a 0 or 2-dimensional precision area and coarse sensors in the form of ring segments which are arranged in the form of rings around the precision area, various elementary control algorithms may be found which guide the effector object to a signal pose starting from the nearby proximity pose. In principle, screw or spiral-shaped search movements lead to the goal. Another alternative are straight movements which are continued at a right angle at each transition to another coarse sensor element.

In the off-line programming of industrial robots, the ability to identify precisely the relative pose of several mechanism $M_1, M_2, \ldots, M_i, \ldots$ with respect to each other is useful, for example, for synchronization of their work programs, also through time-delayed measurement.

For this, the $M_i$ are calibrated with an adequate number of rigidly placed reference objects $R_1, R_2, \ldots R_j, \ldots$ and after calibration their pose with respect to one another is calculated from the poses of the $M_i$ to $R_j$. No alteration to the principal method is necessary for this. The pose of the reference objects with respect to each other must be known and this may be achieved through identification of the distances by a mechanism already known as being calibrated exactly or through other measurement methods. An entire "chain" of mechanisms may be calibrated in this manner and the reference objects may be used for the identification of the scaling factor.

It is, in the same way, often useful in off-line programming of industrial robots, if the robot can not only be measured with respect to its kinematic parameter but if, in addition, its position is also identified.

Figure 20:
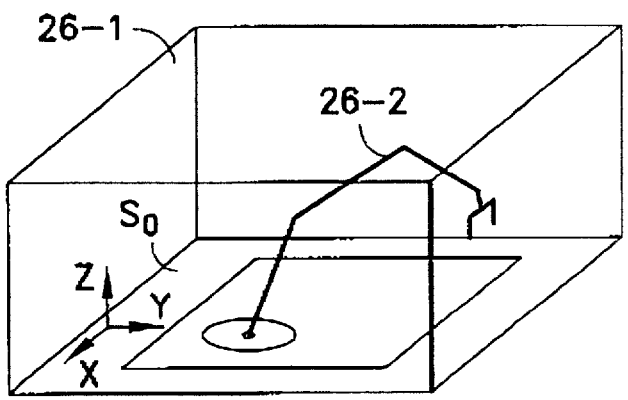
FIG. 20 is a schematic diagram showing a mechanism as part of a work cell and its pose with respect to the coordinate system related to the work cell.

In accordance with FIG. 20, location identification relative to the work cell 26-1 in which the work pieces to be processed is to be found is meaningful if the robot is replaced in the cell by another one on account of a defect, due to wear and tear or change of type. The pose of the mechanism 26-2 is, therefore, to be identified relative to a prescribed coordinate system $S_0$ in the cell 26-1. The pose of an object, for example, is determined uniquely by the pose relative to at least two straight lines or to at least three points.

If the pose of $S_0$ with respect to the reference objects $R_1$, $R_2, \ldots R_m$ is determined uniquely, the pose of the mechanism with respect to $S_0$ may be determined by the process according to the invention by measuring the pose of $R_1$, $R_2, \ldots R_m$ precisely with respect to $S_0$, calibrating M by using $R_1, R_2, \ldots R_m$ and calculating the pose of M with respect to $S_0$ from the poses determined of M to $R_1, R_2, \ldots R_m$ by means of elementary methods of robotics or kinematics.

If the mechanism has already been calibrated, the location of $S_0$ may be determined by a much smaller number of measurement poses than would be necessary if its position and the calibration parameters were to be identified. The same could be achieved if the effector of the mechanism were put after calibration into a certain pose with respect to a reference coordinate system anchored in the mechanism base i.e. if—in a certain respect—the effector "shows" this exact pose, and subsequently the pose of the effector were measured manually with respect to the cell. That, however, would require another measurement and would result in additional measurement errors.

In accordance with the invention, the pose of a mechanism in the workspace may be determined with respect to several reference objects. If an arbitrary object is equipped with reference objects the distance of which is known, a specialisation of the general calibration process pertaining to the invention is obtained which allows measurement of the poses of arbitrary objects. In doing so, the fact is exploited that parameter identification methods alongside the actual relevant mechanism parameters always also identify the pose of the reference object with respect to the reference coordinate system. The latter information is, however, not used any longer by previous calibration methods after calibration. In practical applications, calibration and pose measurement are not generally required at the same time. The method according to the invention is therefore generally used only for one of the two tasks at any given point of time—the focus is not on the simultaneous use of both services but on the isolated or alternating use for one of the tasks.

When using the method according to the present invention for pose measurement, the information resulting is utilised opposite to that in the case of calibration. The pose of the calibration objects is to the fore and the identification of the structure of the mechanism is reduced to the necessary minimum. Mechanisms which are constructed exclusively for the purpose of pose measurement may therefore be of the simplest structure.

A significant characteristic of the pose measurement method used is that any arbitrary mechanism equipped with precise joint encoders may be used for measuring object poses and, in addition, apart from the devices for shape-adjusting calibration, no further devices or modifications to the hardware are required and the precision of the object pose measurement may be increased clearly as compared to the case of customary calibration. This increase is achieved in accordance with the invention in that the number of the joints of the measuring mechanism is kept low and the number of the reference objects is increased correspondingly. Through this measure, the main residue errors arising in customary calibration are reduced which, according to the work by K. Schröer quoted, consist of model errors. These decrease automatically along with decreasing complexity of the mechanism and the complexity depends almost exclusively on the number of axes.

A device which is suitable exclusively for pose measurement consists of a measuring mechanism equipped with at least one effector object for shape-adjusting calibration and associated reference objects. The measuring mechanism may only possess one single joint of which the value may be identified precisely by joint encoders. In particular, any arbitrary mechanism may be used as a precise measuring mechanism in that all joints with the exception of one are held constant.

Object poses can be determined precisely and directly only with respect to a certain coordinate system in the measuring mechanism.

The concrete, modified manner of functioning is explained by examples of embodiments.

Examples of Embodiments

Figure 21:
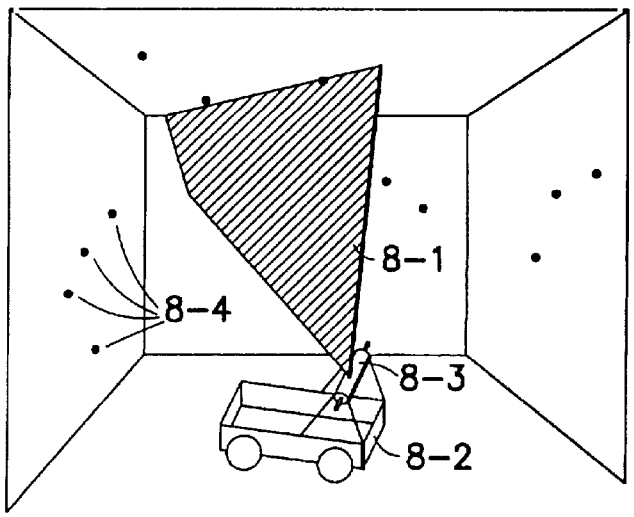
FIG. 21 is a schematic diagram showing an embodiment of the present invention for identification of the pose of an autonomous mechanism/vehicle with a simple mechanism and many detectors distributed in the cell.

A one-joint measuring mechanism 8-2 in FIG. 21 measures its pose within the workspace in accordance with the invention with increased precision. In this case, an effector object 8-3 is a light plane and reference objects 8-4 on the walls of the cell are point-shaped photo detectors of which the distance between them has to be known. For the purpose of pose measurement, the measuring mechanism will rotate the effector object 8-3 about its only axis and the signals at the reference objects 8-4 are registered in the customary manner and passed on to an associated computer system.

If the light plane has been mounted in such a manner that the joint axis lies on this plane, shifting of the mechanism along this axis must always trigger the same signals. Put differently, shifting the mechanism parallel to the joint axis can under no circumstances be recognised using the methods according to the present invention. Consequently, the light plane must, for the purpose of full measurement, be mounted skewed to and intersecting the joint axis.

An unmoved effector coordinate system K, the origin of which lies in the already mentioned point of axis and light plane, is now put into the joint. If the pose of the effector object relative to K is known, which can be pre-supposed, after a single calibration with additional reference objects, six signal poses on six different reference objects are sufficient for precise identification of the pose of K or the pose of the measuring mechanism in space. More than six measurements may be made for error damping whereby a sufficient number of reference objects have to be visible from the mechanism—note that exactly one signal pose only exists per reference object. At least for the specialist, it is obvious that the precision of the calibration parameters identified is almost only restricted by the accuracy of the trigger detector pairs and the joint encoders.

The pose measurement method presented by the example is particularly cost-favourable if the necessary hard and software already exists for the purpose of mechanism calibration.

If the reference objects, similar to those in FIG. 21, are attached to the walls and the ceiling of the work cell of a complex (not necessarily calibrated) mechanism, an effector pose may be identified precisely without the mechanism parameters being known. Measurement takes place in accordance with the invention through exclusive motion of the last joint before the effector and through registration of the signal-transmitting detector concerned and the associated joint value. This supplies an "independent" measurement of the effector pose with greater precision than through normal calibration and subsequent pose calculation.

Figure 22:
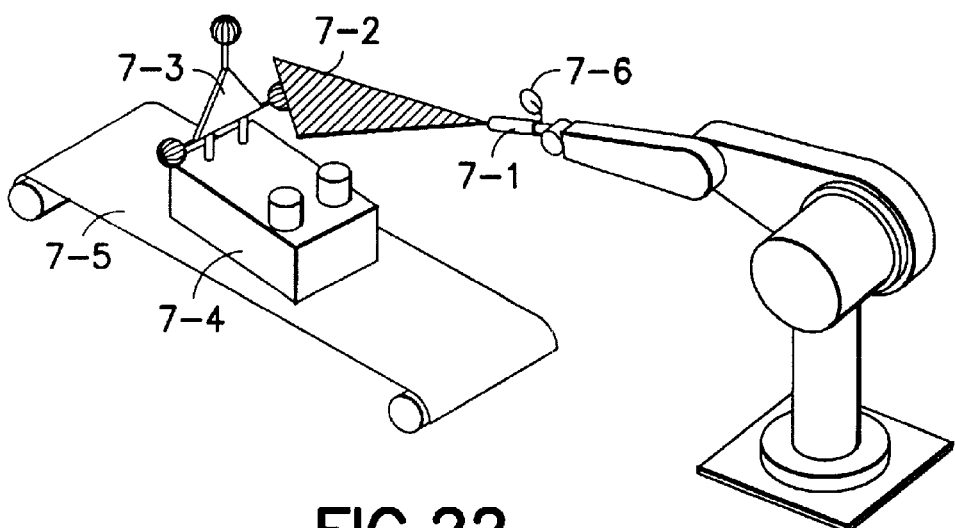
FIG. 22 is a schematic diagram showing another arrangement for measurement of the pose of a workpiece.

The method described in the previous example of FIG. 21 identified the pose of a mechanism relative to stationary reference objects. In FIG. 22, the pose of a moveable object relative to the effector of the robot is to be identified. For this, the workpiece to be identified 7-4 (a cuboid on the conveyor belt 7-5) is equipped, for example, with a system of reference objects 7-3 which is used for pose measurement and can be removed easily—in particular by the mechanism—after the workpiece has been processed. If the three spheres (reference objects 7-3) attached to the workpiece reflect the radiation 7-2 transmitted from a source 7-1 and if a radiation detector is attached additionally on the effector, the pose of the base object or of the workpiece relative to the effector may be identified by three measurements.

Identification of all the calibration parameters influencing the pose accuracy—in short "calibration" —is a strategy for global even increase in the pose accuracy in the whole workspace. Due to the inevitable inadequacies of the mathematical models available for selection and further sources of error, the average precision achieved remains inevitably limited. The alternative or complementary strategy designated as interpolation aims on the other hand for an increased but only local improvement in the pose accuracy without correction of parameters. The basic conception of interpolation is that deviation of the pose which the mechanism has actually attained from the desired target pose is for the most part identical to corresponding deviations in the case of neighbouring target poses. The basic prerequisite for interpolation is that the pose of at least some reference objects is know exactly, e.g., through conventional measurement.

For the purpose of interpolation, the reference objects are positioned as close as possible to those workspace areas in which increased precision is desired. In particular, additional reference objects can be set up primarily for the purpose of interpolation in areas of interest.

The method denoted as first solution determines several individual correction movements for various known poses of the workspace which are to be selected as closely as possible to the target pose. By the various known correction movements, a correction movement for the currently desired target pose is calculated with known, elementary mathematical interpolation algorithms. If only one single correction movement is known, a correspondingly (parallel) displaced repeat of the correction movement at another point is understood as being interpolation in the sense of the present invention.

A detailed explanation of the method will be presented on the basis of examples of embodiments. Only those interpolation methods are claimed here which are based on the use of immaterial reference objects. The significant advantage in this case is that there can be no collisions with the reference objects and that these can therefore remain in the workspace. An additional advantage arises for special embodiments if the effector object(s) is/are so light and compact that it/they can remain permanently on the ordinary hand used for industrial purposes or be integrated in this as part of the design. Previous methods require the replacement of the hand by some "interpolation tool" or a corresponding effector object with all associated disadvantages.

Figure 23:
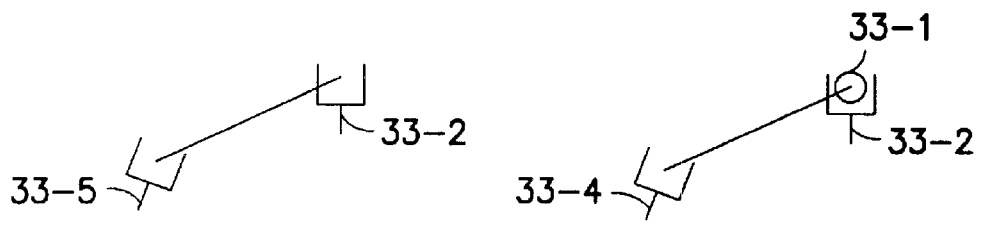
FIG. 23 is a schematic diagram showing the interpolation of a pose.

In FIG. 23, the concept of interpolation is presented on the basis of a reference object 33-1 comprising a laser beam standing perpendicular on the drawing plane. Positions and orientations are represented by a schematic robot hand. If the reference object 33-1 is the only reference object in the proximity of a target pose 33-2 concerned, a signal pose 33-3 which is as similar as possible to the target pose 33-2 (similar orientation and minimum distance) at this reference object is sought. The joint configuration for the signal pose 33-3, in which the signal was actually triggered, differs from a calculated joint configuration which is obtained if the mechanism controller calculates the joint configuration belonging to the signal pose from the mechanism parameters stored in the controller and from the pose of the reference object which is assumed as being known exactly. The calculated joint configuration leads the effector to an incorrect pose 33-4 deviating slightly from the signal pose 33-3. The difference between 33-3 and 33-4 gives a correction movement directly in the (drawing) plane perpendicular to the laser beam 33-1, which correction movement moves the effector from 33-4 to the actual signal pose 33-3 (arrow). The—never exactly valid—assumption is now that the controller calculates in reality a joint configuration to achieve the target pose 33-2 which will position the effector in the pose 33-5 demonstrating the same errors as the incorrect pose 33-4 in relationship to the signal pose 33-3. For this reason an exactly analogous correction movement which corresponds to the movement from pose 33-4 to pose 33-3 in the workspace and which is calculated on the basis of the stored mechanism parameters is carried out on the supposed target pose 33-5 calculated by the control system. The pose reached then will not be exactly the target pose 33-2 (as 33-5 is also not achieved exactly by the control) but is closer to 33-2 than the pose calculated from the calibration parameters.

If three reference objects are to be found in the vicinity of the target pose, then for the three correction movements which were determined separately at the reference objects there is—due to elementary mathematical considerations— exactly one affine transformation ("rotation-displacement") to in the plane which transfers the three positions of type 33-4 to the associated positions of type 33-3. If several reference objects and, possibly, several signal poses at each of the reference objects are included in the interpolation, a suitable and, if relevant, weighted correction movement may be calculated with known elementary methods of the calculus of observations which attain the target pose with increased precision.

If, in the above example, a correction is desired not only on the plane but in the space, a single additional or an additional bundle of parallel laser beam(s) is necessary which stand(s) approximately perpendicularly on 33-1, i.e., for example, in the drawing plane.

Interpolation was, up to now, only carried out using material reference objects and isolated—without integrated calibration. A preceding calibration naturally improves the interpolation results greatly.

Typically, calibration in accordance with the first solution of the present invention will be carried out at greater time intervals; interpolation in accordance with the second solution will be carried out depending on requirement. Complete integration of calibration and interpolation in a coherent process, as presented here for the first time, has the effect of appreciable additional gains in precision and cost advantages.

A further important aspect of some variations of the method and device according to the invention is that calibration and interpolation may be carried out with the same favourably priced hardware without alterations. This yields an integration of these two basic methods for increasing the mechanism precision with respect to process engineering as well as with respect to the employed devices.

The devices pertaining to the invention for carrying out the calibration method pertaining to the invention are described in the claims, in the process descriptions and in the explanations of the figures.

Figure 25:
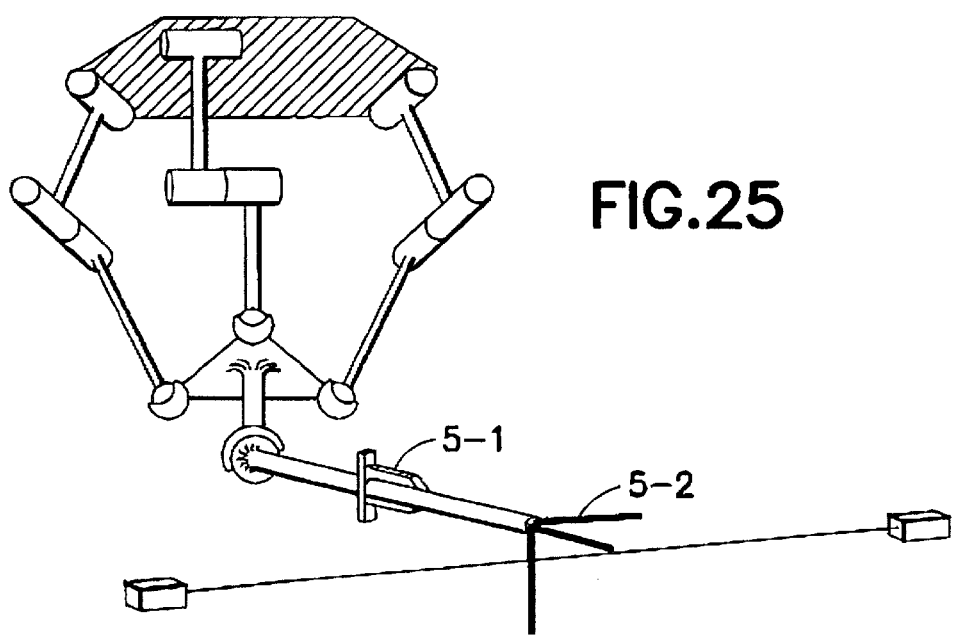
FIG. 25 is a schematic diagram of yet another embodiment of the present invention with a tripod as an effector object for identification of the position of the effector.

A special calibration object which, for example, is arranged on a tripod mechanism in FIG. 25 is equipped with a light barrier and an effector object including a set of two or three orthogonal interrupter rods 5-2 (three are shown in FIG. 25) on the effector 5-1. This calibration object may be used to determine the exact position of the effector after carrying out at least two separate calibrations, i.e., the effector may be included in the calibration. A tool correction otherwise required is not necessary.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for improving the pose accuracy of a mechanism in a workspace, wherein the mechanism is movable in at least one axis with tolerances and includes an effector, at least one effector object is mounted via a rigid connection to the effector eccentric to the at least one axis of the mechanism in an estimated pose with a tolerance in position and orientation, at least one reference object is arranged in the workspace with a tolerance in position and orientation, and a computer system is connected to the mechanism having a measurement control program, a parameter identification program, and a mechanism control program, the at least one effector object and the at least one reference object forming at least one trigger/detector pair comprising a signal trigger device and a signal detector for triggering and detecting a binary signal, wherein a totality of signal poses of the signal detector relative to the trigger device in which a signal is triggered on the signal detector is described by at least one non-trivial characteristic equation, said method comprising the following steps:

(a) selecting a proximity sequence N of a finite number of proximity poses for the at least one trigger-detector pair, each of the proximity poses being located in the vicinity of a respective one of signal poses, wherein the proximity sequence N is selected such that the following criteria are fulfilled:

$D_G(N) \geq D_G(A_I)/15$, whereby the distance on an arbitrary straight line G between two neighbouring points of the projection of the proximity sequence N onto G is at the most $D_G(N)/4$, wherein $D_G$ is a function which maps each subset of the set $A_I$ to the distance between those two points of the projection of this subset on G which are at maximum distance from each other on G;

$A_I$ is the space of all those reachable effector poses of the given mechanism which result from elementary kinematic calculations on the basis of the known mechanism model which in turn is afflicted with tolerances;

G is an arbitrary straight line which contains at least two points of $S_f$; and $S_I$ is a subset of $A_I$ which is denotes the space of proximity poses and is defined by the totality of all those effector object poses where a signal would be expected according to a mathematical calculation based on the parameter values of the known tolerance-afflicted mechanism model, the estimated pose of the reference objects in space, and the estimated pose of the effector object on the mechanism;

(b) searching for a nearby signal pose for each of the proximity poses consecutively through movement of one of the at least one effector object and the mechanism using a simple search algorithm until a signal pose is detected;

(c) passing a momentary joint configuration of the mechanism onto the computer system after the detection thereof in said step (b) and storing the momentary joint configuration in the computer system as a data record;

(d) using a parameter identification program to identify the true values of one of the parameters influencing the pose accuracy of the mechanism and user-specific subsets of this parameter set, whereby a scaling factor is used for the identification of all length-parameters.

2. The method of claim 1, further comprising the step of identifying the scaling factor by moving the effector object into two pose sets A and B of cardinality one for which information about the distance between the poses of the pose set A and the poses of the pose set B is known, whereby the distance between the poses of the pose sets A and B is more than ⅙ of a diameter of the workspace ($\Delta$), preferably ¾$\Delta$, whereby the diameter of the workspace is defined by the maximum of $D_G(A_I)$ where G ranges over all straight lines G and a mean value calculation is carried out for the determination of distances.

3. The method of claim 2, wherein said step of identifying the scaling factor is performed only during a first calibration and the scaling factor is determined during a re-calibration from a comparison of already known selected lengths of the mechanism which are unaltered during customary industrial use.

4. The method of claim 1, wherein the at least one reference object comprises at least two reference objects with a known relative pose to each other, the method further comprising the step of identifying the scaling factor by using at least three calibration objects comprising the at least two reference objects and the at least one effector object, such that the at least one effector object is moved into signal poses of the two reference objects, whereby the distance between the poses of the two reference objects is more than ⅙ of a diameter of the workspace ($\Delta$), preferably ¾$\Delta$, whereby the diameter of the workspace is defined by the maximum of $D_G(A_I)$ where G ranges over all straight lines G and a mean value calculation is carried out for the determination of distances.

5. The method of claim 4, wherein said step of identifying the scaling factor comprises using elongated, stretched out calibration objects which are non-parallel and have a known orientation from a preceding calibration and includes the substeps of:

measuring a distance between two arbitrary points on the calibration objects;

selecting one signal pose one each of the calibration objects;

measuring distances between the signal poses on each of the calibration objects and the arbitrary points;

feeding the measured distances to the computer system; and calculating the geometrical relationship between the calibration objects and the scaling factor.

6. The method of claim 4, wherein said step of identifying the scaling factor is performed only during a first calibration and the scaling factor is determined during a re-calibration from a comparison of already known selected lengths of the mechanism which are unaltered during customary industrial use.

7. The method of claim 1, wherein the at least one effector object comprises at least two effector objects with a known relative pose to each other, the method further comprising the step of identifying the scaling factor by using at least three calibration objects comprising the at least one reference object and the at least two effector objects, such that at least two effector objects are moved into signal poses with at least one reference object, whereby the distance between the poses of the at least two effector objects is more than ⅙ of a diameter of the workspace ($\Delta$), preferably ¾$\Delta$, whereby the diameter of the workspace is defined by the maximum of $D_G(A_I)$ where G ranges over all straight lines G and a mean value calculation is carried out for the determination of distances.

8. The method of claim 7, wherein said step of identifying the scaling factor comprises using elongated, stretched out calibration objects which are non-parallel and have a known orientation from a preceding calibration and includes the substeps of:

measuring a distance between two arbitrary points on the calibration objects;

selecting one signal pose one each of the calibration objects;

measuring distances between the signal poses on each of the calibration objects and the arbitrary points;

feeding the measured distances to the computer system; and calculating the geometrical relationship between the calibration objects and the scaling factor.

9. The method of claim 7, wherein said step of identifying the scaling factor is performed only during a first calibration and the scaling factor is determined during a re-calibration from a comparison of already known selected lengths of the mechanism which are unaltered during customary industrial use.

10. The method of claim 1, wherein one of two effector objects and two reference objects are used.

11. The method of claim 1, further comprising the step of arranging the effector objects and the reference objects such that during execution of arbitrary movements, the effector objects attain signal poses with respect to the reference objects.

12. The method of claim 1, wherein the mechanism includes a plurality of physically connected subsections and said steps (a) to (d) are completed for a selected subsection of the plural physically connected subsections, whereby only the joints of the selected subsection are moved during said steps (a)–(d) and the remaining ones of the physically connected subsections are considered rigid bodies.

13. The method of claim 1, further comprising the step of eliminating the influence of threshold values of the signal detectors, asymmetry in the arrangement of measurement, braking distances of the joints on the joint configuration relayed to the computer system and other signal delays by recording a systematic measurement sequence for each signal pose which includes the approach to and traverse of the signal pose on selected paths, whereby only individual axes of the mechanism are moved, and using the computer system to determine a correct data record using one of elementary mathematical operations and median calculations from detector reactions and associated joint configurations and store the correct data record on the computer system.

14. The method of claim 1 further comprising the steps of measuring and recording the residue errors of a reached target position which remain after calibration and passing the registered values onto one of a learning/adaptive system of an artificial neural network and a rule interpreter for processing and correcting the effector pose.

15. The method of claim 1, further comprising the steps of collecting further data from sensors suitable for the measurement of joint properties, passing the data onto the computer system, and evaluating the data in said step (d).

16. The method of claim 1, wherein one effector object of the at least one effector object and one reference object of the at least one reference object comprises a trigger/detector pair from the pairs comprising:
  i) signal detector and straight electromagnetic wave/cylindrical interrupter rod;
  ii) signal detector and electrically conductive wire/contact rod;
  iii) laser beam/light-sensitive matrix area;
  iv) electrically conductive plane/conductive contact rod;
  v) multi-axis suspended linear guidance with contact threshold/multi-axis suspended, conducted rod;
  vi) point-shaped, line-shaped or planar signal detectors/plane of electromagnetic waves; and
  vii) wedge-shaped electromagnetic wave/several signal detectors.

17. The method of claim 1, wherein at least one calibration object is integrated in the mechanism to be calibrated.

18. The method of claim 1, further comprising the steps of receiving at least one calibration object at the mechanism connected firmly to it and discarding the calibration object after said step (d).

19. The method of claim 1, wherein said step (b) comprises searching for a signal pose using a higher-dimensional sensor areas.

20. The method of claim 1, wherein at least two reference objects are arranged in already known relative pose to each other, said method further comprising the step of determining a measurement of the relative pose of several mechanisms with respect to each other, the poses of the several mechanisms being different in at least one of location and time, by determining the pose of the mechanisms with respect to the reference objects using the parameters identified in the computer system in said step (d) and determining therefrom the poses of the several mechanisms with respect to each other.

21. The method of claim 1, wherein at least two reference objects are arranged in known relative pose, said method further comprising the step of determining the absolute pose of a mechanism with respect to an arbitrary coordinate system having a pose that is known with respect to at least one of the reference objects by determining the pose of the mechanism to the reference objects using the parameters identified in the computer system in said step (d) and determining therefrom the pose of the mechanism to the coordinate system.

22. The method of claim 1, wherein arbitrary objects in the workspace are equipped with reference objects which are at a known distance to each other, said method further comprising the step of measuring the pose of one of the reference objects relative to the mechanism and the objects with respect to each other and determining signal poses successively by the motion of the effector object via motion of a single axis of the mechanism only and calculating therefrom the relative pose of the mechanism and the objects to each other by the computer system.

23. A method for improving the pose accuracy of a mechanism in a workspace, wherein the mechanism is movable in at least one axis with tolerances and includes an effector, at least one effector object is mounted via a rigid connection to the effector eccentric to the at least one axis of the mechanism in an estimated pose with a tolerance in position and orientation, at least one immaterial reference object is arranged in the workspace with an exact known pose, and a computer system is connected to the mechanism having a measurement control program, a parameter identification program, and a mechanism control program, the at least one effector object and the at least one immaterial reference object forming a trigger/detector pair comprising a signal trigger device and a signal detector for triggering and detecting a binary signal, wherein a totality of signal poses of the signal detector relative to the trigger device in which a signal is triggered on the signal detector is described by at least one non-trivial characteristic equation, said method comprising the following steps:
  (a) selecting a proximity sequence N such that it contains at least one proximity pose arranged at a reference object neighbouring a target pose;
  (b) successively searching for detection of a signal pose nearby to the at least one proximity pose through the motion of one of the effector object and mechanism via a simple search algorithm;
  (c) passing the momentary joint configuration of the mechanism onto the computer system and storing the momentary joint configuration as a data record upon detection of the signal in said step (b);
  (d) using the computer system to calculate, for each data record, the incorrect pose in the workspace resulting mathematically on the basis of the mechanism parameters currently known to the controller; and
  (e) calculating a correction movement from the difference between the signal poses and the associated incorrect poses, through elementary interpolation procedures and elementary error compensation algorithms, the correction movement compensating the deviation of the pose actually steered for by the mechanism control from the desired pose, whereby the scalar factor, which was determined from the exactly known pose of the reference object, is used for the calculation of the correction movement from incorrect poses and signal poses.

24. The method of claim 1, wherein after performing said steps (a)–(d) once, the following steps are performed:
  (e) selecting a proximity sequence N such that it contains at least one proximity pose arranged at a reference object neighbouring a target pose;
  (f) successively searching for detection of a signal pose nearby to the at least one proximity pose through the motion of one of the effector object and mechanism via a simple search algorithm;
  (g) passing the momentary joint configuration of the mechanism onto the computer system and storing the momentary joint configuration as a data record upon detection of the signal in said step (f);
  (h) using the computer system to calculate, for each data record, the incorrect pose in the workspace resulting mathematically on the basis of the mechanism parameters currently known to the controller; and (i) calculating a correction movement from the difference between the signal poses and the associated incorrect poses, through elementary interpolation procedures and elementary error compensation algorithms, the correction movement compensating the deviation of the pose actually steered for by the mechanism control from the desired pose, whereby the scalar factor, which was determined from the exactly known pose of the reference object, is used for the calculation of the correction movement from incorrect poses and signal poses.

25. A device for improving the pose accuracy of a mechanism and for pose measurement of objects in the work space, comprising:

a computer system comprising measurement control program, a parameter identification program, and a mechanism control program;

a mechanism moveable in at least one axis which has an effector, said mechanism connected to said computer system;

at least one pair of calibration objects, each pair of said at least one pair comprises an effector object rigidly connected with said effector and mounted eccentrically to the at least one axis of said mechanism and a reference object fixedly arranged relative to said mechanism in said workspace, each pair comprising a signal trigger device and a signal detector for binary signals; and an installation for determining a scaling factor.

26. The device of claim 25, wherein said mechanism is a controllable device comprising at least one of a tripod, hexapod, multi-axis robot, vehicle, and handling device.

27. The device of claim 25, wherein each of said effector object and said reference object are selected from a group comprising:

a CCD matrix-camera, a camera with diffuser which can be placed in a radiation beam, a laser or maser radiation source with a photo detector, a light sensor, a position-sensing device (PSD), a light barrier device, an electrically conductive contact rod, and electrically conductive prolonged wire, a radiation source creating light planes, a radiation source creating light wedges with mirrors or lenses which can be activated permanently or periodically, a two-dimensional sensor array made up of point-shaped light detectors, and rigid bodies of geometrically regular design which may be designed in the form of two or three orthogonal rods with exactly cylindrical rods.

28. The device of claim 25, wherein said effector object device comprises an integral part of said mechanism.

29. The device of claim 25, wherein said effector object is selectively held by said effector on said mechanism.

30. The device of claim 25, wherein said reference object comprises one of a large container known in some dimensions of length with accessible surface of a liquid contained therein and a large plate known in some length dimensions with traceable edges.

31. The device for improving the pose accuracy of a mechanism and for pose measurement of objects in a work space, comprising:

a computer system comprising measurement control program, a parameter identification program, and a mechanism control program;

a mechanism having tolerances and moveable in at least one axis with an effector;

at least one effector object in estimated pose with tolerance in position and orientation is rigidly connected with said effector and mounted eccentrically to said at least one axis of said mechanism;

at least one immaterial reference object arranged fixedly in the workspace and the pose of which is known exactly, wherein each one of said at least one effector object forms a trigger/detector pair with each one of said at least one reference object, said trigger/detector pair comprising a signal trigger device and a signal detector such that each pair is suitable for effecting a triggering and detection of at least binary signals, wherein a totality of signal poses of said signal detector relative to said signal trigger device in which a signal is triggered on the detector are described by at least one non-trivial characteristic equation.

* * * * *